United States Patent
Mickelsen

(10) Patent No.: US 12,484,963 B2
(45) Date of Patent: Dec. 2, 2025

(54) SYSTEMS AND METHODS FOR AFFECTING A TARGET TISSUE VIA A PULSED FIELD

(71) Applicant: Field Medical, Inc., Cardiff by the Sea, CA (US)

(72) Inventor: Steven Mickelsen, Cardiff by the Sea, CA (US)

(73) Assignee: Field Medical, Inc., Cardiff by the Sea, CA (US)

( * ) Notice: Subject to any disclaimer, the term of this patent is extended or adjusted under 35 U.S.C. 154(b) by 0 days.

(21) Appl. No.: 19/098,529

(22) Filed: Apr. 2, 2025

(65) Prior Publication Data
US 2025/0312093 A1 Oct. 9, 2025

Related U.S. Application Data

(60) Provisional application No. 63/573,742, filed on Apr. 3, 2024.

(51) Int. Cl.
*A61B 18/14* (2006.01)
*A61B 18/00* (2006.01)

(52) U.S. Cl.
CPC .............. *A61B 18/1492* (2013.01); *A61B 2018/00696* (2013.01)

(58) Field of Classification Search
CPC ..... A61B 5/0008; A61B 5/053; A61B 18/082; A61B 18/1206; A61B 18/14;
(Continued)

(56) References Cited

U.S. PATENT DOCUMENTS

| 7,857,809 B2 | 12/2010 | Drysel |
| 8,160,690 B2 | 4/2012 | Wilfley et al. |

(Continued)

FOREIGN PATENT DOCUMENTS

| WO | WO 2019/164650 | 8/2019 |
| WO | WO 2024/124245 | 6/2024 |

OTHER PUBLICATIONS

Invitation to Pay Additional Fees and, Where Applicable, Protest Fee for PCT/US2025/022758, mailed May 6, 2025.
(Continued)

*Primary Examiner* — Michael F Peffley
*Assistant Examiner* — Amanda L Zink
(74) *Attorney, Agent, or Firm* — Mills IP Law, PLLC

(57) ABSTRACT

Systems and methods are provided for treating a target tissue. Accordingly, an electrode catheter is positioned in proximity to the target tissue and a dose of energy is delivered. The dose of energy includes a set of pulses at a first frequency. Each pulse has a maximal pulse magnitude and a pulse duration associated with a reference pulse and an energy output that is less than the reference pulse. A pulse waveform of each pulse includes a set of peak intervals at a second frequency and interspersed nadir intervals. The duration of each nadir interval is less than a restitution interval of the target tissue, and the second frequency enhances production of an oxidative reaction. The resultant Maxwell stress substantially equals the Maxwell stress that would be produced by the reference pulse, while the oxidative stress is greater than the oxidative stress producible by the reference pulse.

30 Claims, 24 Drawing Sheets

(58) Field of Classification Search
CPC ........ A61B 18/1815; A61B 2017/3413; A61B 2018/00005; A61B 2018/00059; A61B 2018/00315; A61B 2018/00404; A61B 2018/00434; A61B 2018/00577; A61B 2018/00613; A61B 2018/00714; A61B 2018/1472; A61B 2562/0219; A61B 5/0006; A61B 5/0013; A61B 5/002; A61B 5/0022; A61B 5/0077; A61B 5/01; A61B 5/02055; A61B 5/0261; A61B 5/1107; A61B 5/1112; A61B 5/1116; A61B 5/1117; A61B 5/1118; A61B 5/24; A61B 5/318; A61B 5/33; A61B 5/369; A61B 5/384; A61B 5/388; A61B 5/389; A61B 5/395; A61B 5/483; A61B 5/6803; A61B 5/6806; A61B 5/6807; A61B 5/681; A61B 5/6824; A61B 5/6826; A61B 5/6891; A61B 5/7264; A61B 7/00; A61B 7/04; A61B 7/045; A61B 8/00; A61B 8/06; A61B 8/0808; A61B 8/488; A61B 8/565

See application file for complete search history.

(56) References Cited

U.S. PATENT DOCUMENTS

| | | | |
|---|---|---|---|
| 8,221,411 B2 | 7/2012 | Francischelli et al. |
| 8,226,648 B2 | 7/2012 | Paul et al. |
| 8,282,631 B2 | 10/2012 | Davalos et al. |
| 8,538,501 B2 | 9/2013 | Venkatachalam et al. |
| 8,734,442 B2 | 5/2014 | Cao et al. |
| 9,055,959 B2 | 6/2015 | Vaska et al. |
| 9,168,096 B2 | 10/2015 | Kreindel |
| 9,198,733 B2 | 12/2015 | Neal et al. |
| 9,283,051 B2 | 3/2016 | Garcia et al. |
| 9,289,258 B2 | 3/2016 | Cohen |
| 9,301,801 B2 | 4/2016 | Scheib |
| 9,517,103 B2 | 12/2016 | Panescu et al. |
| 9,788,885 B2 | 10/2017 | Long et al. |
| 9,795,442 B2 | 10/2017 | Salahieh et al. |
| 9,913,685 B2 | 3/2018 | Clark et al. |
| 10,004,558 B2 | 6/2018 | Long et al. |
| 10,238,447 B2 | 3/2019 | Neal et al. |
| 10,245,105 B2 | 4/2019 | Davalos et al. |
| 10,292,755 B2 | 5/2019 | Arena et al. |
| 10,322,286 B2 | 6/2019 | Viswanathan et al. |
| 10,342,598 B2 | 7/2019 | Long et al. |
| 10,342,600 B2 | 7/2019 | Callas et al. |
| 10,433,906 B2 | 10/2019 | Mickelsen |
| 10,448,989 B2 | 10/2019 | Arena et al. |
| 10,517,672 B2 | 12/2019 | Long |
| 10,994,133 B2 | 5/2021 | Sano et al. |
| 11,254,926 B2 | 2/2022 | Neal et al. |
| 11,259,869 B2 | 3/2022 | Mickelsen |
| 11,278,349 B2 | 3/2022 | Stewart et al. |
| 11,298,175 B2 | 4/2022 | Konings |
| 11,351,368 B2 | 6/2022 | Pakhomov et al. |
| 11,376,064 B2 | 7/2022 | Rankin |
| 11,382,681 B2 | 7/2022 | Arena et al. |
| 11,389,234 B1 | 7/2022 | Viswanathan et al. |
| 11,406,820 B2 | 8/2022 | Sano et al. |
| 11,453,873 B2 | 9/2022 | Davalos et al. |
| 11,464,968 B2 | 10/2022 | Howard |
| 11,497,541 B2 | 11/2022 | Pare et al. |
| 11,589,921 B2 | 2/2023 | Viswanathan |
| 11,622,803 B2 | 4/2023 | Mickelsen et al. |
| 11,638,603 B2 | 5/2023 | Sano et al. |
| 11,655,466 B2 | 5/2023 | Neal et al. |
| 11,690,671 B1 | 7/2023 | Mickelsen |
| 11,738,200 B2 | 8/2023 | Viswanathan |
| 11,952,568 B2 | 4/2024 | Neal et al. |
| 12,076,070 B2 | 9/2024 | Forsyth et al. |
| 12,178,503 B1 | 12/2024 | Mickelsen |
| 12,329,447 B2 | 6/2025 | Mickelsen |
| 12,329,449 B2 | 6/2025 | Mickelsen et al. |
| 2002/0177765 A1 | 11/2002 | Bowe et al. |
| 2003/0014098 A1 | 1/2003 | Quijano et al. |
| 2005/0052630 A1* | 3/2005 | Smith .................. A61N 1/327 355/53 |
| 2012/0310230 A1 | 12/2012 | Willis |
| 2014/0163546 A1 | 6/2014 | Govari et al. |
| 2014/0364845 A1 | 12/2014 | Rashidi |
| 2015/0011995 A1 | 1/2015 | Avitall et al. |
| 2015/0133914 A1 | 5/2015 | Koblish |
| 2015/0148796 A1 | 5/2015 | Bencini |
| 2015/0289923 A1 | 10/2015 | Davalos et al. |
| 2016/0100884 A1 | 4/2016 | Fay et al. |
| 2016/0324573 A1 | 11/2016 | Mickelsen et al. |
| 2018/0250508 A1* | 9/2018 | Howard .................. A61B 5/33 |
| 2019/0209238 A1 | 7/2019 | Jimenez |
| 2020/0289188 A1 | 9/2020 | Forsyth et al. |
| 2020/0398048 A1 | 12/2020 | Krimsky et al. |
| 2021/0228260 A1 | 7/2021 | Canady et al. |
| 2022/0000548 A1 | 1/2022 | Mickelsen |
| 2022/0096151 A1 | 3/2022 | Shuros |
| 2022/0192741 A1 | 6/2022 | Reinders et al. |
| 2022/0257297 A1 | 8/2022 | Koop et al. |
| 2022/0273945 A1 | 9/2022 | Bowers et al. |
| 2022/0278674 A1* | 9/2022 | Cadossi .................. A61N 1/327 |
| 2022/0338925 A1 | 10/2022 | Stewart et al. |
| 2022/0354567 A1 | 11/2022 | Melman et al. |
| 2022/0370122 A1 | 11/2022 | Smail |
| 2023/0212255 A1 | 7/2023 | Yao et al. |
| 2024/0299088 A1 | 9/2024 | Mickelsen |
| 2024/0299089 A1 | 9/2024 | Mickelsen |
| 2024/0307114 A1 | 9/2024 | Mickelsen |
| 2024/0307115 A1 | 9/2024 | Mickelsen |
| 2024/0307116 A1 | 9/2024 | Mickelsen |
| 2024/0307117 A1 | 9/2024 | Mickelsen |
| 2024/0382248 A1 | 11/2024 | Melman et al. |
| 2025/0064370 A1 | 2/2025 | Leeflang et al. |

OTHER PUBLICATIONS

Chang, Donald C., "Cell poration and cell fusion using an oscillating electric field," Biophysical Journal, vol. 56, Oct. 1989, pp. 641-652.

Sweeney, Daniel C. et al., "Characterization of Cell Membrane Permeability In Vitro Part I: Transport Behavior Induced by Single-Pulse Electric Fields," Sage Journals, Technology in Cancer Research & Treatment, vol. 17: pp. 1-15, Sep. 19, 2018.

Szlasa, Wojciech et al., "Oxidative Effects during Irreversible Electroporation of Melanoma Cells—In Vitro Study," In Vitro Study. Molecules. 2021; 26(1):154.

International Search Report and Written Opinion for PCT/US2025/022758, mailed Jul. 10, 2025.

\* cited by examiner

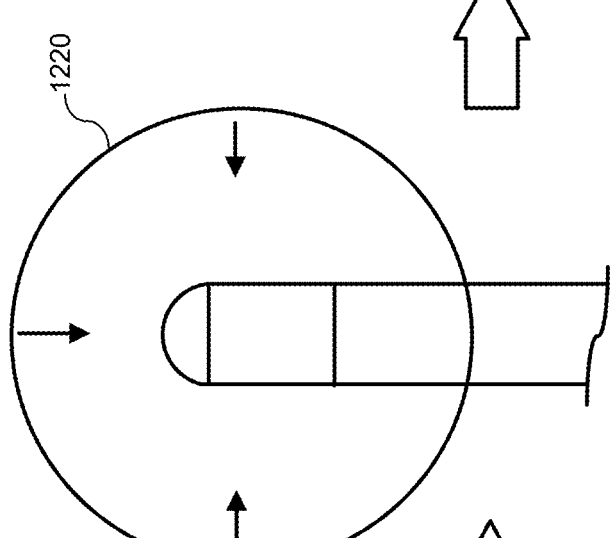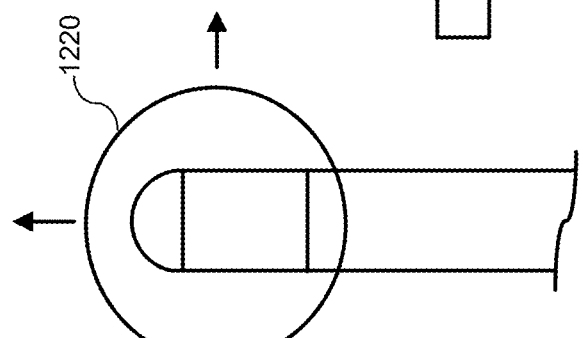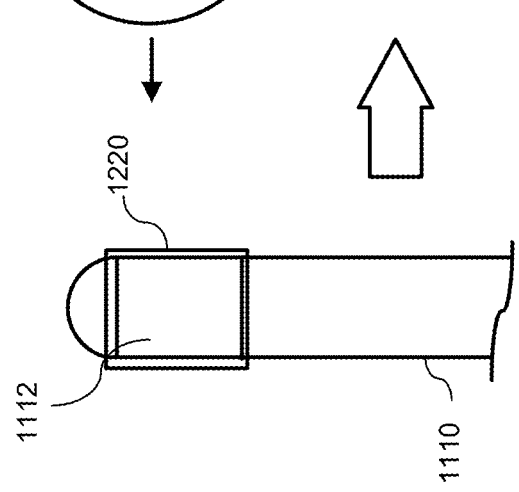

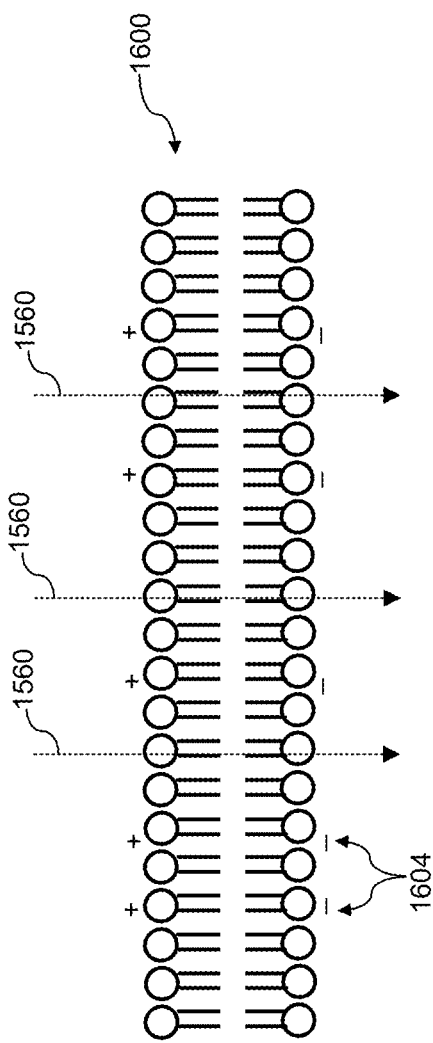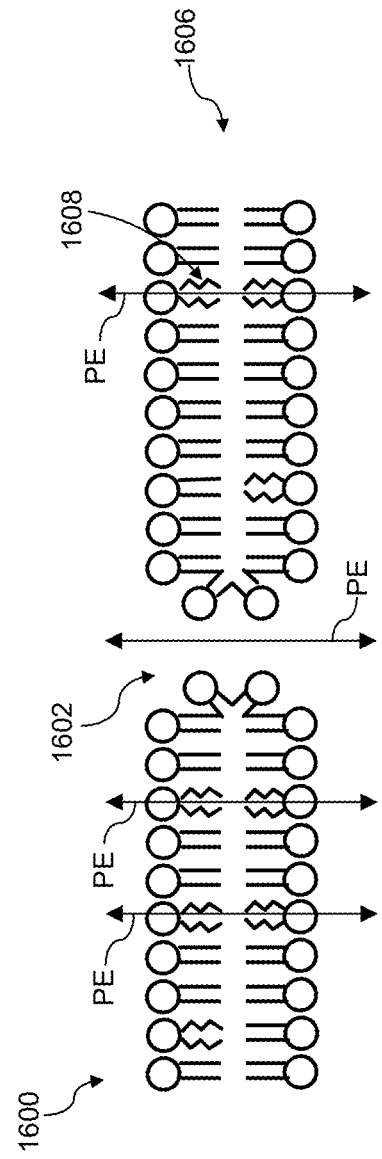

SYSTEMS AND METHODS FOR AFFECTING A TARGET TISSUE VIA A PULSED FIELD

CROSS-REFERENCE TO RELATED APPLICATIONS

This patent application claims priority to and the filing date benefit of U.S. Provisional Application No. 63/573,742, entitled "Systems and Methods for Affecting a Target Tissue via a Pulsed Field," filed Apr. 3, 2024, which is incorporated herein by reference in its entirety.

BACKGROUND

The embodiments described herein relate to delivering a pulsed field to a target location. More particularly, the embodiments described herein relate to delivering a pulsed field to a target tissue to affect the viability of the target tissue.

Electrode catheters are widely used to deliver an electrical charge to affect a target tissue during the treatment of a variety of medical issues. For example, in certain cardiac applications, electrode catheters can be used to affect (e.g., ablate) various cardiac tissues, such as pulmonary veins or myocardial tissue. The affecting of the pulmonary veins can treat arrhythmias, such as atrial fibrillation by isolating the veins or otherwise isolating the signals that cause arrhythmia.

In some known procedures, the electrical charge includes high-voltage, short-duration electrical pulses to induce strain on the target tissue to bring about a desired modification of the target tissue. For example, the target tissue can be affected via the development of electroporation resulting from an electrical field produced adjacent the target tissue by the high-voltage, short-duration electrical pulses. Electroporation can affect the permeability of a cellular membrane (i.e., by opening pores in the cell membrane), which can, in turn, affect the viability of the target tissue. If the electrical field applied exceeds a threshold value, the electroporation is considered irreversible and the pores remain open, permitting exchange of materials across the membrane that lead to necrosis and/or apoptosis (cell death). Ablating tissue via irreversible electroporation can reduce thermal tissue damage when compared to other known treatment methods, such as radio frequency (RF) ablation or cryogenic ablation.

However, the delivery of an electrical charge sufficient to develop the irreversible electroporation can sometimes produce undesirable heating and/or far-field stimulation. Far-field stimulation of excitable tissues can produce undesirable tissue movement and pain. Accordingly, some known methods of treatment using irreversible electroporation are not practical for use on a conscious patient (e.g., due to the discomfort of the "jumps" and pain caused by undesired tissue stimulation). To limit the undesirable effects, some known systems employ biphasic stimulation to reduce the heating and/or far-field stimulation effects. However, biphasic stimulation is typically less efficient at affecting the target tissue than monophasic stimulation pulses.

Other known methods seek to reduce the undesired heating and/or far-field stimulation effects by reducing the overall amount of energy delivered. Such methods generally include shortening the pulse width of the voltage delivered. Although such methods reduce the overall amount of energy delivered, the reduction in energy can also result in less effective treatment of the target tissue. Specifically, reducing the pulse width or increasing the duration between pulses can reduce the time during which the pores remain open.

Additionally, in some instances, known methods produced localized temperatures near the catheter tip that exceed 100° C., which can result in "steam pops." Steam pops are gaseous bubbles that form and pop during the procedure, which can result in undesired tissue damage.

Additionally, known systems and methods of electroporation that are effective for one type of target tissue (e.g., within the atrium) may not be easily adaptable for use in other types of target tissue (e.g., within the ventricle).

Thus, a need exists for improved methods for affecting a target tissue via a pulsed field in a manner that reduces and/or eliminates the undesired heating and far-field stimulation and also allows for adaptability to different target tissue types, while achieving the desired effects on the target tissue.

SUMMARY

This summary introduces certain aspects of the embodiments described herein to provide a basic understanding. This summary is not an extensive overview of the inventive subject matter, and it is not intended to identify key or critical elements or to delineate the scope of the inventive subject matter.

In some embodiments, a method for treating a target tissue includes disposing an electrode catheter in proximity to the target tissue. A dose of energy that includes a set of pulses is delivered to the target tissue via the electrode catheter. Each pulse from the set of pulses has a maximal pulse magnitude and a pulse duration associated with a reference pulse that produces a desired permeability effect on the target tissue when the electrode catheter is spaced a reference distance apart from the target tissue. A pulse waveform of at least one pulse from the set of pulses includes, within the pulse duration, at least a first peak interval and a second peak interval with a nadir interval therebetween. A magnitude of the nadir interval is less than the maximal pulse magnitude. A duration of the nadir interval is associated with a restitution interval associated with the target tissue. The pulse waveform produces a permeability effect within the target tissue that is at least 80 percent of the desired permeability effect produced by the reference pulse when the electrode catheter is spaced the reference distance apart from the target tissue.

In some embodiments, the permeability effect includes a diffusive permeability of at least one cell of the target tissue. In some embodiments, the permeability effect corresponds to transition of a pore in a cell wall of at least one cell of the target tissue to an open condition and maintaining the pore in the open condition for at least the pulse duration and the pulse duration is greater than the restitution interval of the pore.

In some embodiments, a method for treating a target tissue includes disposing an electrode catheter in proximity to the target tissue. A dose of energy that includes a set of pulses at a first frequency is delivered to the target tissue via the electrode catheter. Each pulse from the set of pulses has a maximal pulse magnitude and a pulse duration associated with a reference pulse that produces a desired effect on the target tissue. A pulse waveform of at least one pulse from the set of pulses includes, within the pulse duration, a set of peak intervals and a set of nadir intervals. A nadir interval of the set of nadir intervals is between each pair of peak intervals of the plurality of peak intervals. A magnitude of each nadir interval is less than the maximal pulse magnitude. The set of peak intervals is at a second frequency that is within a range that develops an oxidative stress within the target tissue.

Other medical devices, related components, medical device systems, and/or methods according to embodiments will be or become apparent to one with skill in the art upon review of the following drawings and detailed description. It is intended that all such additional medical devices, related components, medical device systems, and/or methods included within this description be within the scope of this disclosure.

BRIEF DESCRIPTION OF THE DRAWINGS

FIGS. 14A-14D are schematic illustrations of an oscillation frequency of a bubble formed in response to one pulse of a set of pulses of a dose of energy according to an embodiment.

FIGS. 15A-15B are schematic illustrations of an effect of a pulsed field on the permeability of a cellular membrane according to an embodiment.

DETAILED DESCRIPTION

Figure 1:
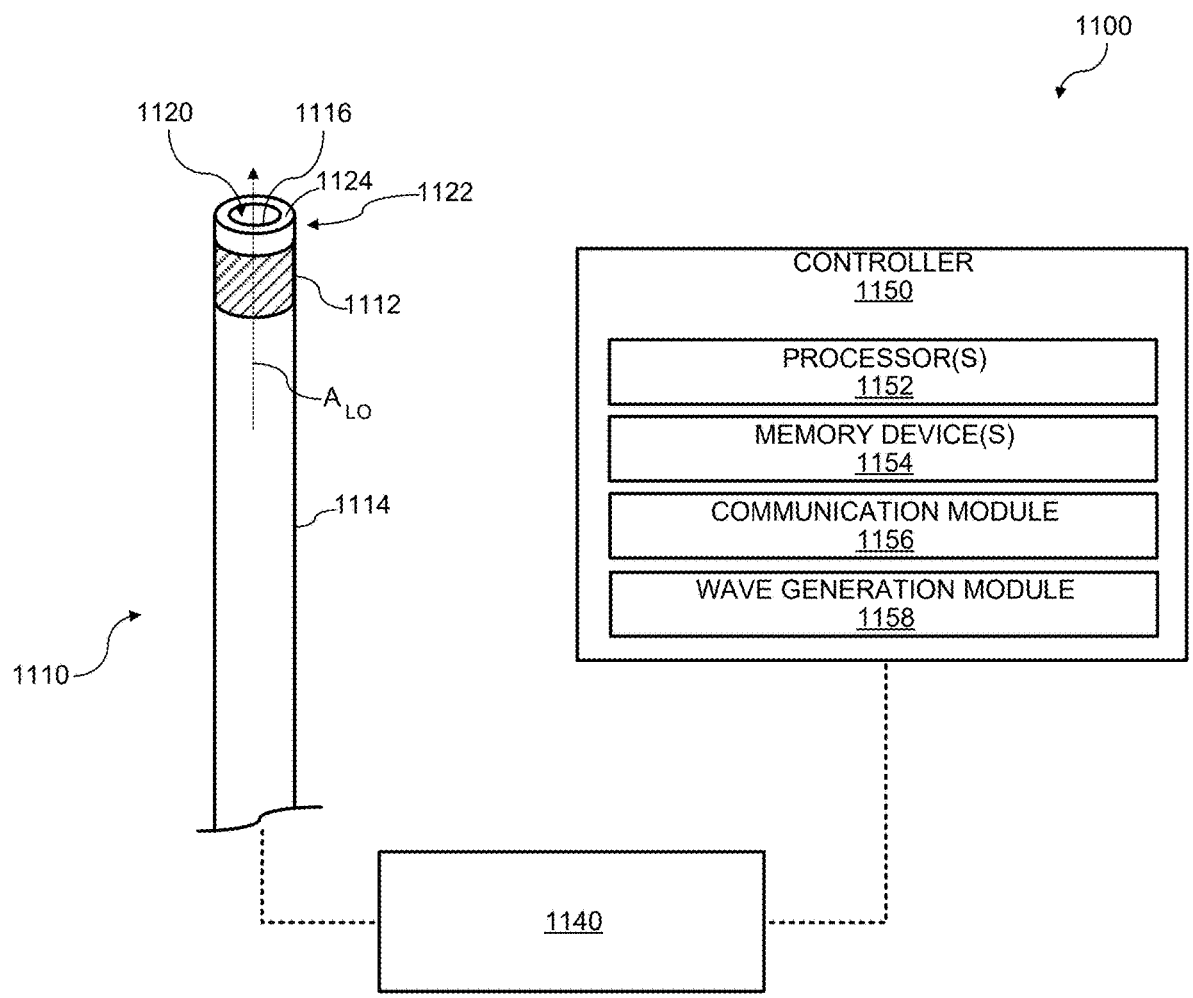
FIG. 1 is a schematic view of a medical system with an electrical catheter according to an embodiment.

Generally, the present disclosure is directed to systems and methods for affecting a target tissue via a pulsed field. While a pulsed field (i.e., a dose of energy) made up of a number of high-energy pulses (i.e., reference pulses) can affect the target tissue, the total energy (i.e., the reference-pulse magnitude and reference pulse duration) required to bring about the desired affect can also result in undesirable heating and/or far-field stimulation. Accordingly, the systems and methods described herein facilitate affecting the target tissue via the delivery of a titrated dose of energy to the target tissue while also mitigating and/or eliminating undesirable heating, far-field stimulation, and/or formation of undesired bubbles. In particular, the waveforms of each pulse of the dose of energy are shaped (e.g., titrated) to affect the target tissue in a manner that is at least substantially similar to that of a reference high-energy pulse while minimizing the undesired heating and far-field stimulation. For example, a high-energy reference pulse of a certain magnitude and a certain duration can be suitable to achieve the desired effects on the target tissue. The waveforms described herein are shaped to reduce the total energy of the pulse relative to the total energy of the high-energy reference pulse for the same duration, while having at least a substantially similar effect on the target tissue. Said another way, a reference pulse can correspond to a single pulse of a dose of energy that could be used to affect the target tissue if side effects, such as heating of the target tissue and/or far-field stimulation were not considered or were otherwise deemed acceptable, while the waveforms described herein are shaped so that each pulse of the dose of energy affects the target tissue while also mitigating and/or eliminating the side effects that would be encountered if the reference pulse were delivered instead.

Affecting the target tissue can, for example, include transitioning the target tissue to a nonviable state without affecting the structural integrity of the target tissue (e.g., cell necrosis or death). In other words, the delivery of the dose of energy made up of pulses that each have the pulse waveform can permanently halt the various functions of the cells of the target tissue but leave the structure of the cells (e.g., the cell membranes) in place so that the structural integrity of the target tissue is substantially unaffected. In contrast, a non-titrated dose of energy (e.g., a dose of energy made up of high-energy reference pulses) can destroy the structure of the cells of the target tissue thereby disrupting the structural integrity of the target tissue.

In some embodiments, the systems and methods described herein can be used to treat the target tissue by producing a permeability effect (e.g., transitioning a pore in a cell wall to an open condition in response to an electrophoretic force) within the target tissue. For example, an electrode catheter can be disposed in proximity to the target tissue and a dose of energy can be delivered. The dose of energy can include a set of individual pulses. The dose of energy can be a titrated dose in which each of the individual pulses has a total energy level that is less than the energy level of a corresponding reference pulse that is configured to achieve the same permeability effect within the target tissue. Said another way, each individual pulse of the dose of energy has a maximal pulse magnitude and a pulse duration that are associated with the reference pulse and produce the desired permeability effect when the electrode catheter is spaced a reference distance from the target tissue.

As previously mentioned, each individual pulse has a pulse waveform shaped to achieve the desired effect on the target tissue while mitigating and/or eliminating the undesired effects (e.g., far-field stimulation) associated with the use of a reference pulse to achieve the same effect. Specifically, the pulse waveform includes, within the pulse duration, at least a first peak interval and a second peak interval with a nadir interval therebetween. Thus, the pulse waveform can be referred to as a crenellated waveform. The duration of the nadir interval can, for example, be associated with (e.g., be less than or proportional to) a restitution interval of the target tissue. The restitution interval corresponds to a time interval during which a pore or channel in a cell membrane (e.g. a membrane transporter protein) that is forced open by an electrophoretic force can re-close following the application of the force. Said another way, the pulse waveform can be shaped such that the voltage magnitude and duration of first peak interval develops an initial electrophilic force sufficient to open the pore. The following nadir interval has a voltage magnitude that is less than the magnitude of the first peak interval, and does not develop a sufficient electrophilic force to maintain the pore in the open state. Therefore, the pore begins to reclose. The restitution interval is the time interval for the pore to reclose. The subsequent second peak interval is then delivered prior to the pore transitioning to a closed state (i.e., prior to the expiration of the restitution interval), and the pore is maintained in the open state. The effect on the target tissue is at least substantially the same as the effect that would otherwise be expected from delivering a reference pulse. However, as the reference pulse has a single voltage magnitude during the entire duration of the pulse as opposed to the decreased voltage magnitude of the nadir interval, the total joule energy delivered by the reference pulse is greater than the total joule energy of the pulse waveform. The reduction in joule energy (derived from the use of the pulse waveforms described herein) of the titrated energy dose of the present disclosure mitigates and/or eliminates the undesirable heating and/or far-field stimulation.

In some embodiments, the permeability effect produced by the systems and methods described herein can result, at least partially, from an oxidative stress that is developed within the target tissue in response to the delivery of the dose of energy. Without being bound by theory it is believed that the delivery of energy can generate radical oxygen species that degrade lipids and proteins thereby damaging the cell membrane structure. This, in turn, can increase the permeability effect and promote more efficient irreversible electroporation. Therefore, in some embodiments, the dose of energy can include a set of individual pulses delivered to the target tissue in a manner (e.g., at a frequency and/or magnitude) that enhances the production of radical oxygen species, thereby causing a desired permeability effect. Specifically, in some embodiments, the dose of energy can include a set of individual pulses delivered to the target tissue at a first frequency. Each of the pulses can include a pulse waveform shaped to increase the oxidative stress within the target tissue. Accordingly, the pulse waveform can include, during a single pulse duration, a set of peak intervals and a set of nadir intervals. The nadir intervals can, for example, be disposed between each pair of peak intervals and can have a magnitude that is less than a maximal pulse magnitude. The peak intervals can be at a second frequency that is within a range that develops or enhances the development of the oxidative stress. For example, the delivery of the peak intervals can align a number of polarized molecules of a cell of the target tissue to amplify a local electrical field. The amplification of the local electrical field can develop a peroxidation of a portion of the saturated bonds of hydrophilic lipid chains within the lipid bilayer of a cell of the target tissue. Said another way, the oxidative stress can correspond to an oxidation-reduction reaction within the lipid bilayer of the cell that results in an increased permeability of the cell wall in regions not associated with a pore (e.g., that may be opened by other mechanisms as described herein). The oxidative stress developed by the pulse waveform via the multiple peak intervals can be greater than the oxidative stress of a reference pulse lacking the dispersed nadir intervals. At the same time, the total joule energy delivered via a single pulse having the pulse waveform is less than the total joule energy of such a reference pulse. Therefore, the undesirable heating and/or far-field stimulation are mitigated and/or eliminated.

In some embodiments, the permeability effect produced by the systems and methods described herein can include both the oxidative stress and an additive Maxwell stress (e.g., a pore opening in response to an electrophoretic force). Accordingly, in some embodiments, the titrated dose of energy can include a set of pulses at a first frequency. Each of the pulses can include a pulse waveform shaped to increase the oxidative stress and the Maxwell stress within the target tissue. Accordingly, the pulse waveform can include, during a single pulse duration, a set of peak intervals and a set of nadir intervals. The nadir intervals can, for example, be disposed between each pair of peak intervals and can have a magnitude that is less than a maximal pulse magnitude. The peak intervals can be at a second frequency that is within a range that develops the oxidative stress. Similarly, each nadir interval has a duration that is less than the restitution interval of the target tissue such that a pore that is opened by a preceding peak interval does not reclose prior to the delivery of the following peak interval, thereby, increasing the Maxwell stress. The combination of the oxidative stress and the Maxwell stress can increase the effectiveness of the dose of energy in treating the target tissue, while mitigating and/or eliminating the side effects associated with the delivery of a dose of energy made up of a set of reference pulses.

As used herein, the term "about" when used in connection with a referenced numeric indication means the referenced numeric indication plus or minus up to 10 percent of that referenced numeric indication unless otherwise described herein. For example, the language "about 50" covers the range of 45 to 55. Similarly, the language "about 5" covers the range of 4.5 to 5.5.

As used in this specification and the appended claims, the word "distal" refers to direction towards a work site, and the word "proximal" refers to a direction away from the work site. Thus, for example, the end of a medical device that is closest to the target tissue would be the distal end of the medical device, and the end opposite the distal end (i.e., the end manipulated by the user) would be the proximal end of the medical device.

Further, specific words chosen to describe one or more embodiments and optional elements or features are not intended to limit the invention. For example, spatially relative terms-such as "beneath", "below", "lower", "above", "upper", "proximal", "distal", and the like—may be used to describe the relationship of one element or feature to another element or feature as illustrated in the figures. These spatially relative terms are intended to encompass different positions (i.e., translational placements) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the term "below" can encompass both positions and orientations of above and below. A device may be otherwise oriented (e.g., rotated 90 degrees or at other orientations) and the spatially relative descriptors used herein interpreted accordingly. Likewise, descriptions of movement along (translation) and around (rotation) various axes include various spatial positions and orientations. The combination of a body's position and orientation defines the body's pose.

Similarly, geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

In addition, the singular forms "a", "an", and "the" are intended to include the plural forms as well, unless the context indicates otherwise. The terms "comprises", "includes", "has", and the like specify the presence of stated features, steps, operations, elements, components, etc. but do not preclude the presence or addition of one or more other features, steps, operations, elements, components, or groups.

FIG. 1 is a schematic view of a medical system 1100 for treating a target tissue via a pulsed field. The medical system 1100 includes an electrode catheter 1110 configured to deliver the dose of energy as a pulsed electric field to the target tissue. The medical system 1100 also includes an energy generator 1140 that is electrically coupled to the electrode catheter 1110. The energy generator 1140 is configured to generate the dose of energy to affect the target tissue. The medical system 1100 further includes a controller 1150 coupled to the energy generator 1140. The controller 1150 is configured to control the energy generator 1140 so that the dose of energy is delivered to the target tissue via the electrode catheter 1110 in response to an operator input.

In some embodiments, the electrode catheter 1110 has an outer electrode 1112 coupled to an outer surface 1114 of a tubular catheter body 1111. The electrode catheter 1110 also includes an inner electrode 1116, as illustrated in the cross-sectional view of the electrode catheter 1110 of FIG. 2, which is taken along a longitudinal axis $A_{LO}$ of the electrode catheter 1110. The inner electrode 1116 is coupled to an inner surface 1118 facing a lumen 1120 defined by the tubular catheter body 1111 of the electrode catheter 1110. The outer electrode 1112 and the inner electrode 1116 are offset along the longitudinal axis $A_{LO}$ from a distal end portion 1122 of the electrode catheter 1110. Said another way, the catheter tip 1124 has an absence of electrodes. For example, each of the outer electrode 1112 and the inner electrode 1116 can be offset from the catheter tip 1124 by at least 0.01 millimeters and at most 100 millimeters. Said another way, the distal end portion 1122 of the electric catheter 1110 can extend in a range of 0.01 millimeters to 100 millimeters along the longitudinal axis ALO from the catheter tip 1124 and have an absence of electrodes.

Figure 2:
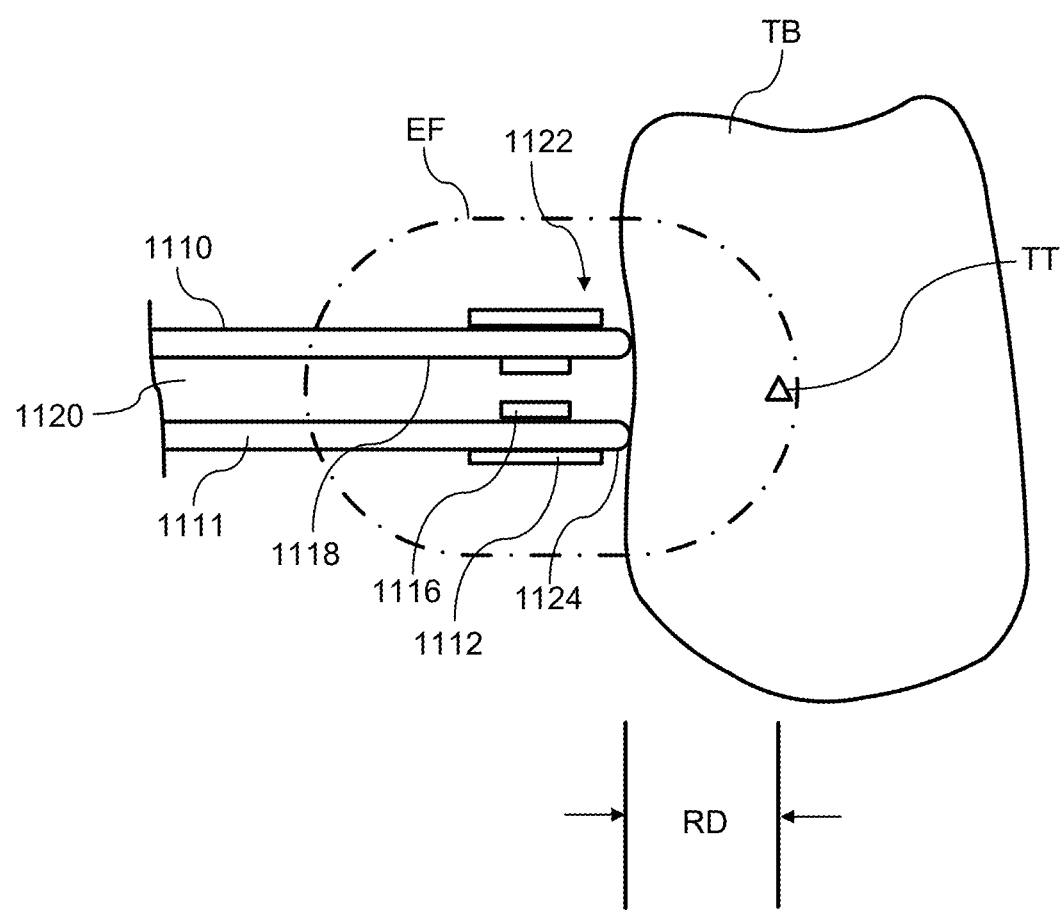
FIG. 2 is a cross-sectional schematic view of the electrical catheter of FIG. 1 disposed in proximity to a target tissue.

As depicted in FIG. 2, the outer electrode 1112 and the inner electrode 1116 are separated by the catheter body 1111. In some embodiments, at least a portion of the catheter body 1111 can include an electrically insulating material. The conductivity of the electrically insulating material can be, for example, less than 0.1 micro-Siemens per centimeter. In some embodiments, the catheter body 1111 can include a dielectric material with a high dielectric constant. A portion of the catheter body 1111 separating the outer electrode 1112 and the inner electrode 1116 can, for example, be an aluminum nitride ceramic. However, a portion of the catheter body extending from the outer electrode 1112 away from the distal end portion 1122 can, in some embodiments, be made of a different material. In some embodiments, the electrode catheter 1110 can be any of the electrode catheters shown and described in U.S. Pat. No. 11,690,671, filed Dec. 9, 2022 and entitled "Tissue Ablation Catheter with an Insulator Between Inner and Outer Electrodes," the disclosure of which is incorporated herein by reference in its entirety.

In some embodiments, the distal end portion 1122 and or the catheter tip 1124 of the electrode catheter can be positioned at or near the target tissue TT such that the outer electrode 1112 and/or the inner electrode 1116 are separated from the target tissue TT by a reference distance RD. Although it is not required, in some embodiments, the outer electrode 1112 can be in contact with a tissue body TB, which includes the target tissue TT. As the inner electrode 1116 is positioned within the lumen 1120, the inner electrode 1116 is not in direct contact with the tissue body TB. On a condition that the outer electrode 1112 and/or the inner electrode 1116 are separated from the target tissue TT by the reference distance RD, a pulsed electrical field EF (produce by delivery of a titrated dose of energy) delivered via the electrode catheter 1110 has a magnitude configured to affect the target tissue TT at the reference distance RD. Said another way, the magnitude of the pulsed electrical field EF is configured to produce a permeability effect within the cells of the tissue body at least through a distance up to the reference distance RD. The reference distance RD can, for example, correspond to a distance in the range of 3 millimeters to 7 millimeters (e.g., such as 5 millimeters). The magnitude of the reference distance RD is dependent on the magnitude of the peak voltage of the pulsed electrical field EF, and vice versa. For example, a higher peak voltage is required when the reference distance is 5 millimeters that is required when the reference distance RD is 3 millimeters. Similarly, if the target tissue is at a greater depth within the tissue body, a greater magnitude of the peak voltage may be required to achieve the desired irreversible electroporation. To facilitate affecting the target tissue TT at the reference distance RD, in some embodiments, the lumen 1120 can carry an irrigation fluid that is infused into the tissue body TB. The irrigation fluid can be conductive to facilitate transmission of the pulsed electrical field EF to the target tissue TT. For example, in some embodiments, the fluid may be a 9% saline solution.

As depicted in FIG. 1, the controller 1150 includes one or more processor(s) 1152 and associated memory device(s) 1154 configured to perform a variety of computer implemented functions (e.g., performing the methods, steps, calculations and the like and storing relevant data as disclosed herein). Additionally, in some embodiments, the controller 1180 includes a communication module them 1156 to facilitate communications between the controller 1150 and the various components of the medical system 1100.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 1154 may generally comprise memory element(s) including, but not limited to, computer readable medium (e.g., random access memory (RAM)), computer readable nonvolatile medium (e.g., a flash memory), a floppy disc, a compact disc read only memory (CD ROM), a magneto optical disc (MOD), a digital versatile disc (DVD) and/or other suitable memory elements. Such memory device(s) 1154 may generally be configured to store suitable computer readable instructions that, when implemented by the processor(s) 1154, configure the controller 1150 to perform various functions. For example, the computer readable instructions may, when implemented by the processor(s) 1154 configure the controller 1150 execute a plurality of operations to deliver a dose of energy from the energy generator 1140 to the target tissue TT via the electrode catheter 1110. The plurality of operations can correspond to any of the methods described herein and can be implemented via the medical system 1100 to affect the target tissue via a pulsed field while also mitigating and/or eliminating undesirable heating of the tissue body TB and/or far-field stimulation.

In some embodiments, the controller 1150 includes a waveform generation module 1158. The waveform generation module 1158 can be configured to shape the waveform of each pulse of a dose of energy delivered to the target tissue TT to treat the target tissue TT while also mitigating and/or eliminating undesirable heating and/or far field stimulation. For example, the waveform generation module 1158 can control the energy generator 1140 such that each pulse of the dose of energy delivered via the electrode catheter 1110 has a titrated total joule energy that is less than the total joule energy of a reference pulse without substantially diminishing the resultant permeability effect within the target tissue resulting from each delivered pulse of the dose of energy. In some embodiments, the waveform generation module 1158 can be an independent module of the controller 1150. However, in some embodiments the waveform generation module 1158 can be included within the memory device(s) 1154 and/or the processor(s) 1152. In still further embodiments, the waveform generation module 1158 can be communicatively disposed between the controller 1150 and the generator 1140.

Figure 3:
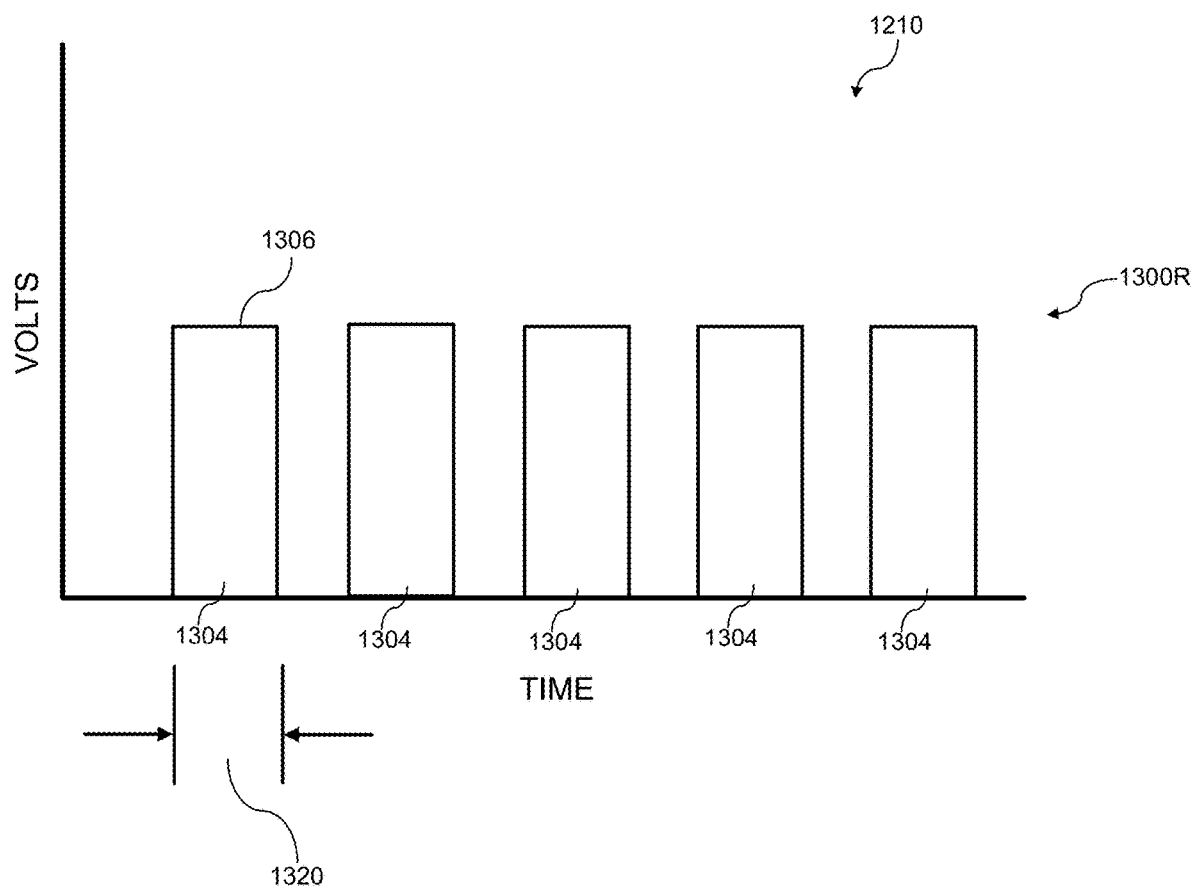
FIG. 3 is a graphical representation of a dose of energy that includes a set of reference pulses.

FIG. 3 is a graphical representation of a reference dose of energy 1210 that includes a plurality 1300R of reference pulses 1304. The reference dose of energy 1210 depicted in FIG. 3 can be considered a non-titrated dose. Therefore, each of the reference pulses 1304 has a voltage magnitude and a duration to produce a desired permeability effect within the target tissue. Said another way, the reference dose of energy 1210, such as depicted, develops the desired permeability effect within the target tissue but can also heat the tissue to a point at which the structural integrity of the cells of the target tissue is compromised (e.g., thermally ablate the target tissue). Additionally, the reference dose of energy 1210 can result in the electrical stimulation of nontargeted tissues (e.g., far-field stimulation), which, in turn, negatively affects such a treatment.

Figure 4:
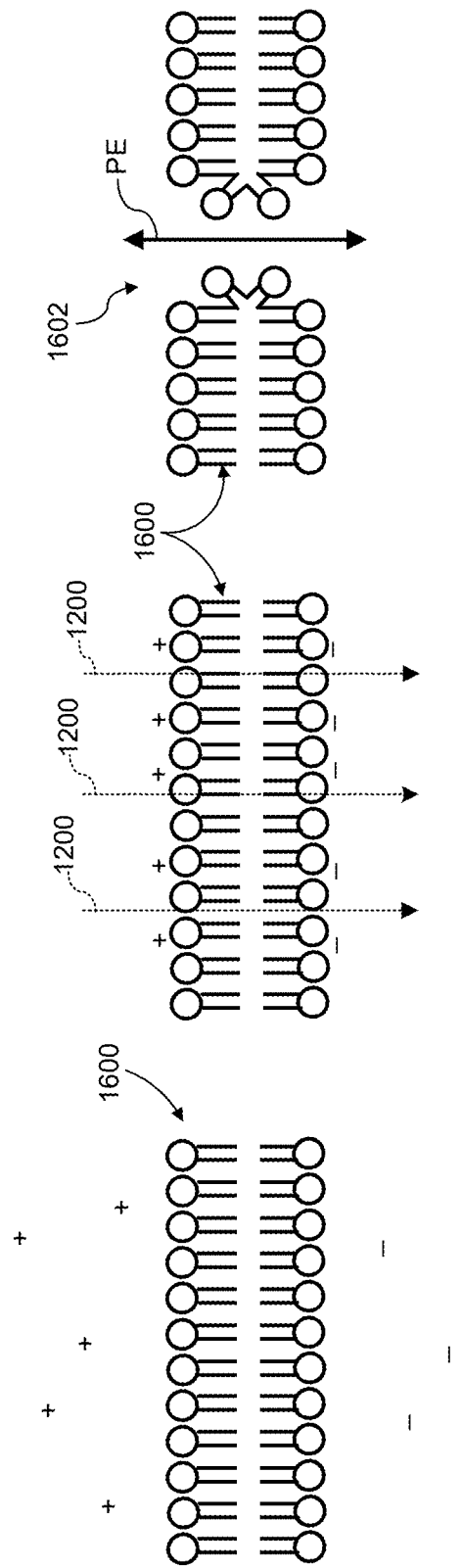
FIGS. 4A-4C are schematic illustrations showing an effect of a pulsed field on the permeability of a cellular membrane according to an embodiment.

The voltage magnitude and the duration of each reference pulses 1304 (and titrated pulses shaped in accordance with the pulse waveform as described below) are sufficient to affect the target tissue via electroporation whereby the electric field (e.g., produced in the tissue by the reference dose of energy 1210) directly induces cellular damage. For example, each reference pulse 1304 can have a square waveform with a single voltage rise to a maximal voltage magnitude that is maintained for the duration 1320 of the reference pulse 1304 to affect the target tissue via electroporation. FIGS. 4A-4C are schematic depictions of a permeability effect PE on a cell of the target tissue that is produced via the delivery of the dose of energy 1200. At step A (FIG. 4A), a cell wall 1600 (e.g., a cell membrane) is depicted in an unaffected state. At step B (FIG. 4B), a pulse (e.g., a reference pulse 1304) is delivered to the tissue to produce a pulsed electric field adjacent to the cell. The pulse induces a voltage differential across the cell wall 1600. In response to the voltage differential, a pore 1602 of the cell wall 1600 is forced to transition to an open state, as depicted at step C (FIG. 4C). With the pore 1602 in the open state, the permeability of the cell is increased. Maintaining the pore 1602 in the open state (e.g., maintaining the permeability effect PE) for a specified interval transitions the cell to a nonviable state. Similarly stated, maintaining the pore 1602 in the open state longer than a threshold time will result in irreversible electroporation.

Figure 5:
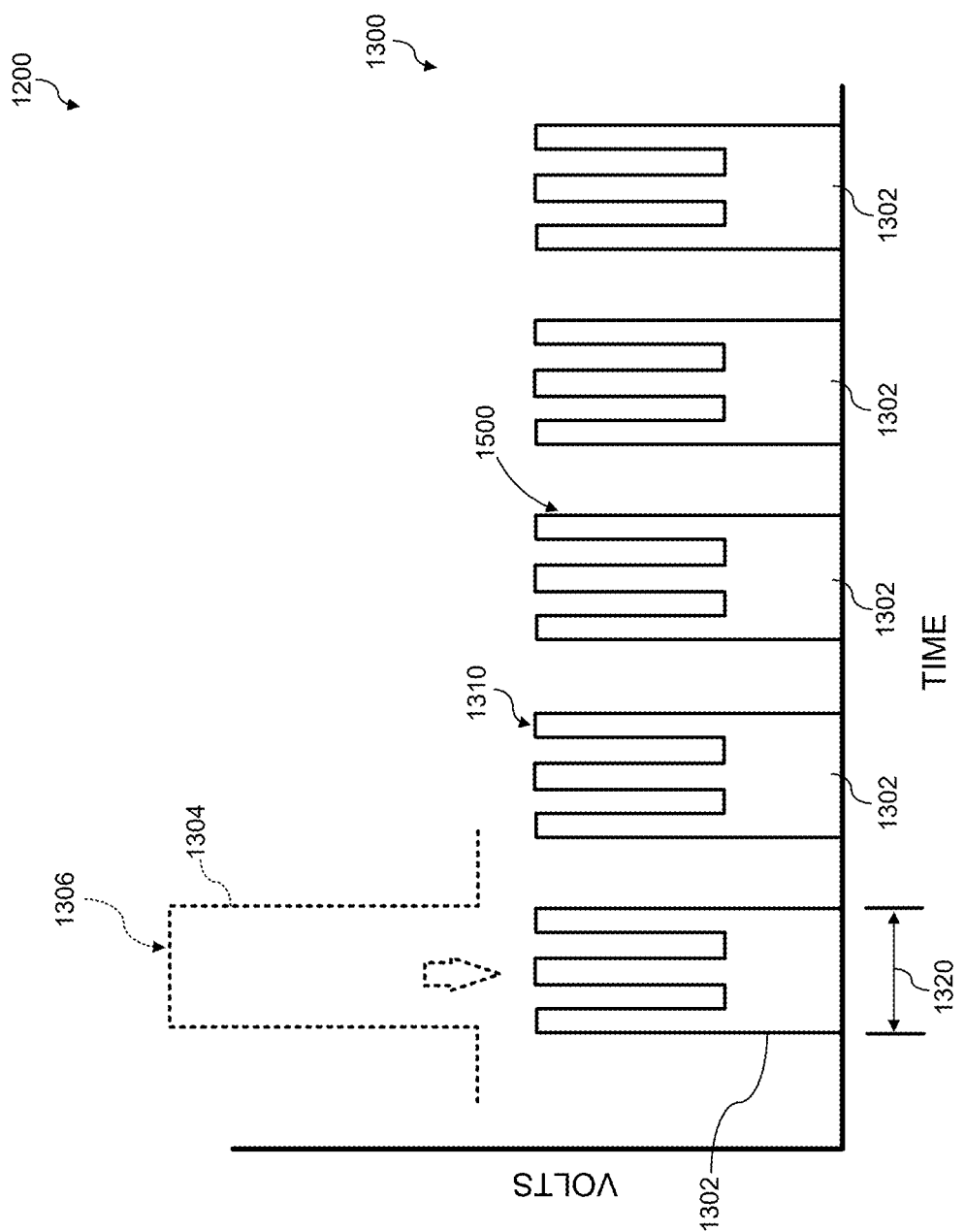
FIG. 5 is a graphical representation of a dose of energy that includes a set of pulses that each have a pulse waveform according to an embodiment.
Figure 6:
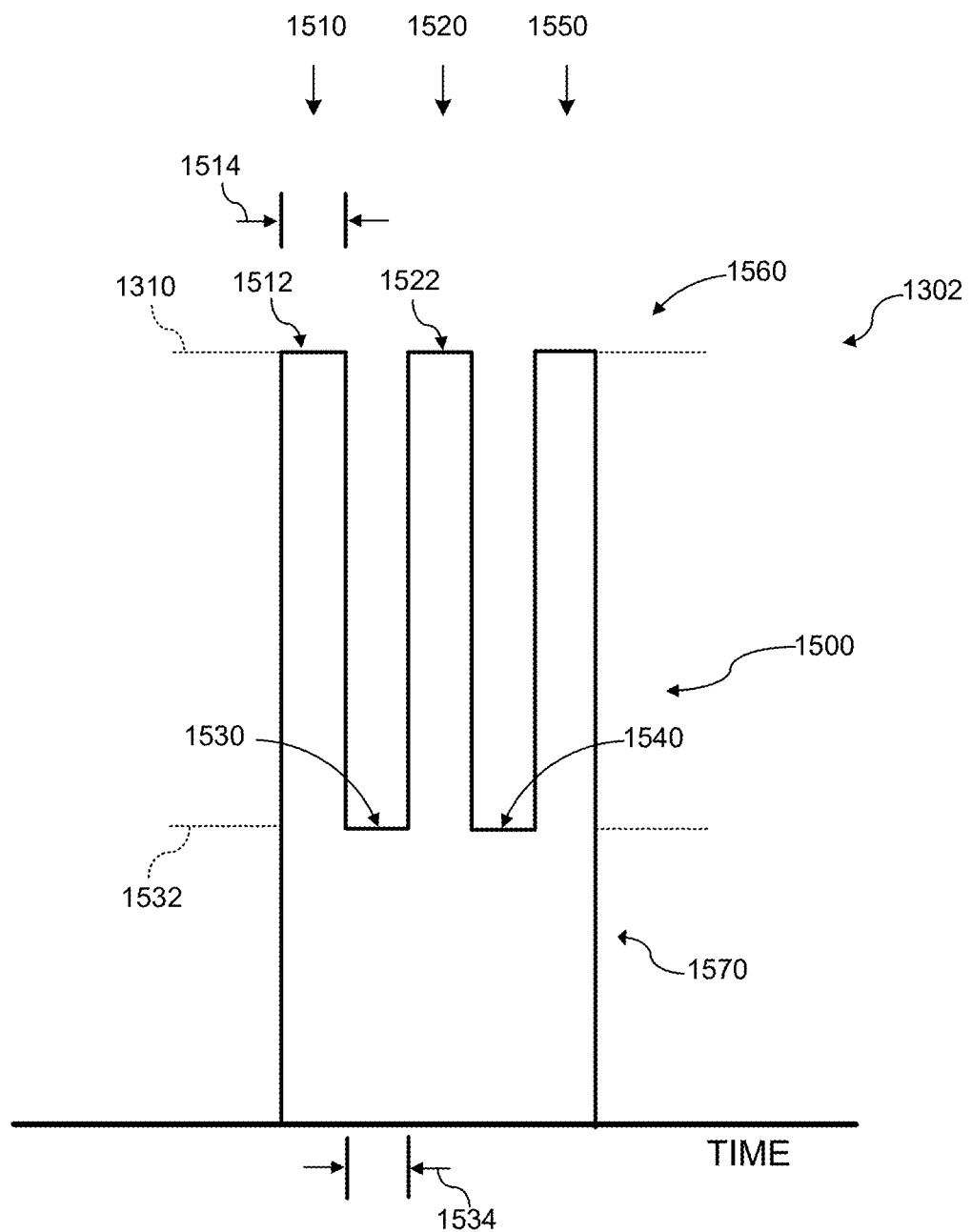
FIG. 6 is a graphical representation of a single pulse of the dose of energy of FIG. 5 with the pulse waveform.

In view of the negative side effects associated with producing the desired permeability effect within the target tissue via the delivery of the reference dose of energy 1210 (e.g. through the delivery of a set of reference pulses 1304), reducing the total joule energy delivered via each pulse of a titrated dose of energy while also maintaining (or improving) the permeability effect is desirable. Accordingly, as depicted in FIGS. 5 and 6, in some embodiments, the dose of energy 1200 can be titrated through the inclusion of a plurality of pulses 1300 of which, at least one pulse 1302 includes a pulse waveform 1500 that is shaped (e.g., crenelated) to treat the target tissue (e.g., produce a desired permeability effect) while reducing the total joule energy delivered to the target tissue. In some embodiments, the permeability effect produced by the pulse waveform 1500 can correspond to a diffusive permeability, an oxidative stress, a Maxwell stress, electroporation and/or combinations thereof.

In some embodiments, the delivery of the dose of energy 1200 causes at least one cell of the target tissue to transition to a nonviable state without substantially compromising the structural integrity of the target tissue. In contrast, treatment by delivering the reference dose of energy can heat the target tissue and/or the surrounding tissue to such an extent that the structural integrity of the affected cells is compromised. In some embodiments, the target tissue can, for example, be a cardiac muscle tissue and at least one muscle cell of the cardiac muscle tissue can be transitioned to a nonviable state via the delivery of the dose of energy for the treatment of an arrhythmia. In some embodiments, the cardiac muscle tissue can correspond to an atrium of a heart. Similarly, in some embodiments, the cardiac muscle tissue corresponds to a ventricle of the heart such that the delivery of the dose of energy is for the treatment of a ventricular arrhythmia.

Referring still to FIGS. 5 and 6, in some embodiments, treating the target tissue with a titrated dose of energy includes disposing an electrode catheter (e.g., the electrode catheter 1110) in proximity to the target tissue. The dose of energy 1200 (i.e., the titrated dose of energy) delivered via the electrode catheter includes a plurality of pulses 1300. Each pulse 1302 of the plurality of pulses 1300 has a maximal pulse magnitude 1310 (e.g., a maximal voltage output of the individual pulse 1302) and a pulse duration

1320. The dose of energy includes the plurality of pulses 1300 at a desired period 1321 (the time duration between the leading edge of each successive pulse 1302). Although the dose of energy 1200 is shown as including five pulses 1302, in other embodiments, the dose of energy 1200 can include any suitable number of pulses. In some embodiments, a dose of energy 1200 can include between 5 and 30 pulses 1302. In some embodiments, a dose of energy can include between 5 and 15 pulses. The maximal pulse magnitude 1310 and the pulse duration 1320 of each pulse 1302 (e.g., each titrated pulse shaped by the waveform 1500) can be associated with the reference pulse 1304. For example, the maximal pulse magnitude 1310 can correspond to a reference-pulse magnitude 1306 (shown in FIG. 3 and also shown broken lines in FIG. 5 for reference) and the pulse duration 1320 can be the same for both the pulse 1302 and the reference pulse 1304 (shown in FIG. 3 and also shown broken lines in FIG. 5 for reference). The reference-pulse magnitude 1306 (and by extension, the maximal pulse magnitude 1310) and the pulse duration 1320 can be configured to produce a desired permeability effect on the target tissue when the electrode catheter is spaced a reference distance RD apart from the target tissue (see FIG. 2).

In some embodiments, the pulse waveform 1500 of at least one pulse 1302 of the plurality of pulses 1300 can include, within the pulse duration 1320 (e.g., the duration of a single pulse 1302), at least a first peak interval 1510 and a second peak interval 1520 with a nadir interval 1530 therebetween. A magnitude 1532 (e.g., a voltage magnitude) of the nadir interval 1530 is less than the maximal pulse magnitude 1310. In other words, the joule energy delivered to the target tissue during the nadir interval 1530 of the single pulse 1302 is less than the joule energy delivered during the peak intervals 1510, 1520 such that the joule energy of the single pulse 1302 is less than the joule energy of the reference pulse 1304 of the same pulse duration 1320. The duration 1534 of the nadir interval 1530 is associated with the restitution interval RI (FIG. 7) of a cell of the target tissue. In some embodiments, the pulse waveform 1500 produces a permeability effect within the target tissue that is at least 80% (e.g., within a range of 80% to 120%) of the desired permeability effect that would otherwise be produced by the reference pulse 1304 when the electrode catheter is spaced the reference distance RD apart from the target tissue TT. In other embodiments, the pulse waveform 1500 produces a permeability effect within the target tissue that is at least 90% (e.g., within a range of 90% to 120%) of the desired permeability effect that would otherwise be produced by the reference pulse 1304 when the electrode catheter is spaced the reference distance RD apart from the target tissue TT. In yet other embodiments, the pulse waveform 1500 produces a permeability effect within the target tissue that is substantially the same as the desired permeability effect that would otherwise be produced by the reference pulse 1304 when the electrode catheter is spaced the reference distance RD apart from the target tissue TT.

Referring still to FIGS. 5 and 6, in some embodiments the reference-pulse magnitude 1306 and the pulse duration 1320 are determined based on one or more attributes of the target tissue. The relevant attributes of the target tissue can include, for example, tissue type, tissue thickness, target depth, tissue resistivity, tissue conductivity, and/or other similar attributes that can affect the delivery of the dose of energy to the target tissue at the magnitude necessary to affect the target tissue. Accordingly, affecting the target tissue with the pulse electrical field (e.g., treating the target tissue with a titrated dose of energy) according to the methods described herein can include determining the restitution interval for a cell membrane of the target tissue based on the relevant attributes of the target tissue and the reference-pulse magnitude 1306. Further, determining (e.g., shaping) the pulse waveform 1500 can include determining a first peak magnitude 1512 and a first peak duration 1514 of the first peak interval 1510 based on the permeability effect to be achieved and the relevant attributes of the target tissue. The resultant waveform (defined by the peak intervals 1510, 1520 with the nadir interval 1530 therebetween) has an additive permeability effect that is at least 80% of, 90% of, or substantially equals the permeability effect of the reference pulse 1304 but with a total joule energy delivered that is less than the reference pulse 1304.

Due to the crenelated shape of the pulse waveform 1500 relative to that of the reference pulse 1304, each titrated pulse 1302 has an energy output that is less than the energy output of the reference pulse 1304. For example, in some embodiments, the energy output of each pulse 1302 of the plurality of pulses 1300 is in a range of 50 joules to 100 joules per pulse 1302. In some embodiments, the energy output of each pulse 1302 can be in a range of between 10% and 75% of the energy output of the reference pulse 1304. In other embodiments, the energy output of each pulse 1302 can be in a range of between 25% and 75% of the energy output of the reference pulse 1304. In yet other embodiments, the energy output of each pulse 1302 can be in a range of between 25% and 50% of the energy output of the reference pulse 1304. In addition to limiting the likelihood of undesirable far-field stimulation, the lower total energy output of the pulse 1302 relative to the energy output of the reference pulse 1304 mitigates a resultant temperature increase in the target tissue and the surrounding tissue body. Said another way, the magnitude of the increase in the temperature of the target tissue caused by the delivering of the pulse waveform 1500 is less than the magnitude of the increase in temperature that would otherwise result by the delivery of the reference dose of energy 1210 via the plurality of reference pulses 1304. For example, in some embodiments, the energy output of each pulse 1302 of the plurality of pulses 1300 can correspond to a temperature increase of a cubic centimeter of water in a range of 1° C. to 10° C.

Figure 7:
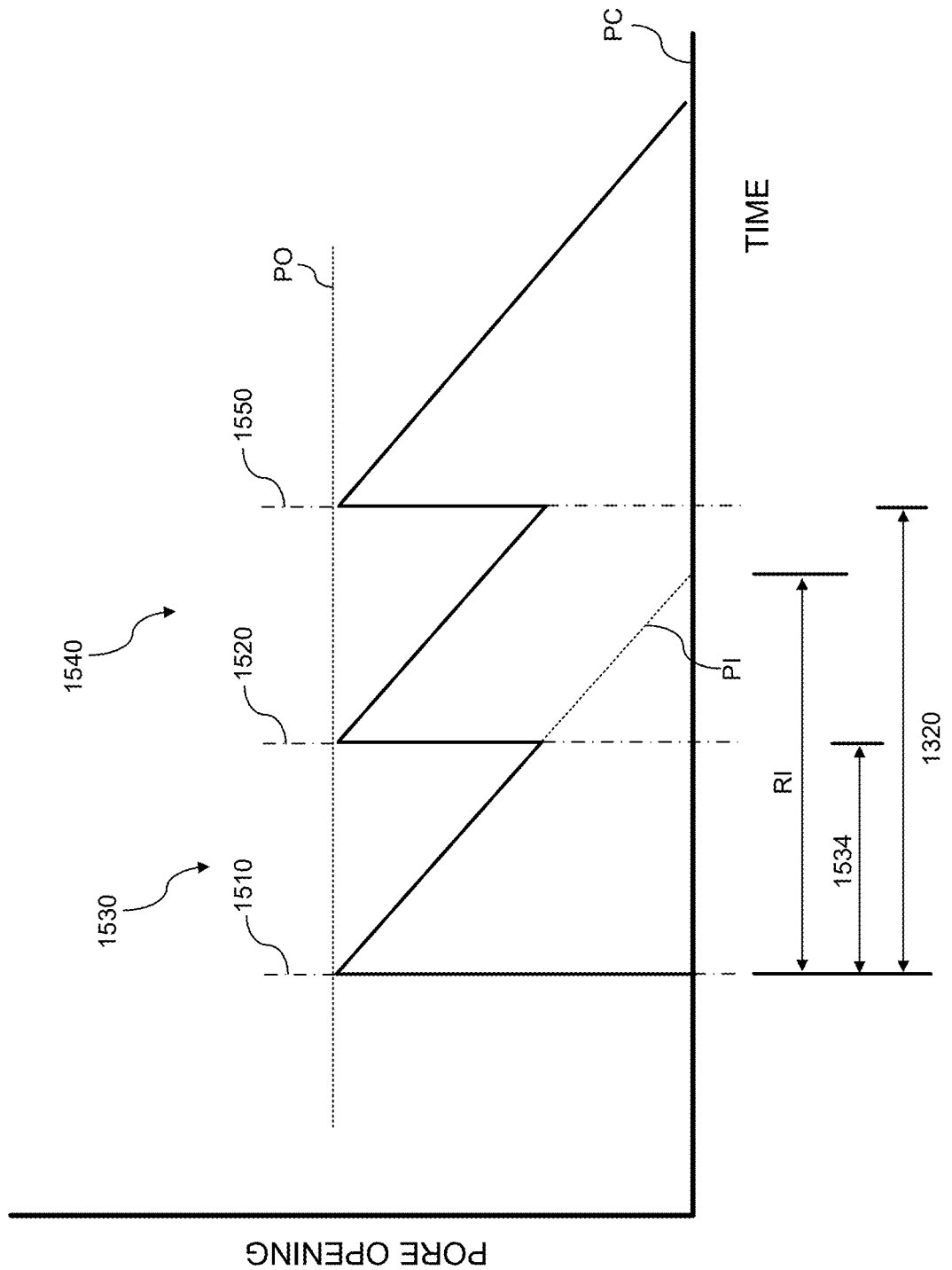
FIG. 7 is a graphical representation of a cellular restitution in response to the pulse waveform of FIG. 5.

FIG. 7 schematically shows the effects of the pulse waveform 1500 of a single pulse 1302 on the state of a cell pore that is opened when energy is delivered according to an embodiment. More particularly, FIG. 7 is a graphical representation of a transition of the pore to an open state (caused by the delivery of energy) followed by a period of cellular restitution (i.e., the restitution interval RI) in response to the nadir intervals within the pulse waveform 1500. The pulse 1302 (see FIG. 6) characterized in FIG. 7 includes three peak intervals 1510, 1520, 1550 that are separated from one another by nadir intervals 1530, 1540. As depicted, upon delivery of the first peak interval 1510, a pore of cell wall is transitioned substantially to a fully open state PO. This is followed by the initiation of the restitution interval RI coinciding with the transition of the waveform 1500 from the first peak interval 1510 to the first nadir interval 1530, which has a lower voltage magnitude. Upon the conclusion of the restitution interval, absent the delivery of the second peak interval 1520, the pore would otherwise substantially transition a closed state PC. However, because the nadir interval 1530 has a duration 1534 that is less than the restitution interval RI, the pore transitioned to an open state PO by the voltage of first peak interval 1510 does not transition back to the fully closed state PC prior to the delivery of the voltage of the second peak interval 1520. (The interrupted portion of the restitution interval is depicted in FIG. 7 by the dashed line PI.) The delivery of the second peak interval 1520 returns the pore to the substantially fully open state PO. The subsequent restitution interval coinciding with the second nadir interval 1540 is then, again, interrupted by the delivery of the third peak interval 1550. In some embodiments, the third peak interval 1550 can be the final peak interval of the single pulse 1302. Accordingly, the pore can, in some embodiments, substantially transition the closed state PC following delivery of the pulse 1302. However, in some embodiments, the delivery of the pulse 1302 can damage the cell wall such that the pore remains at least partially open following the single pulse 1302.

As depicted in FIG. 7, the pulse duration 1320 is greater than the restitution interval RI. However, the duration 1534 of the nadir interval 1530 is such that the pore is maintained in the open state during the pulse duration 1320 without requiring a high-energy output (e.g., the maximal pulse magnitude 1310) during the entirety of the duration 1320 of the single pulse 1302. Accordingly, the permeability effect resulting from the pore being maintained in the open state is achieved by the pulse 1302 via a lower total voltage delivered during the pulse duration 1320 (e.g., a lower total joule energy) than would be required to achieve the same effect via the reference pulse 1304. Said another way, the crenelated pulse waveform 1500 has an additive permeability effect resulting from the plurality of peak intervals. The additive permeability effect is at least 80% of, 90% of, or substantially equals the permeability effect of the reference pulse but does so while having a total lower energy output due to the lower energy output of the nadir interval 1530.

In some embodiments, the duration 1534 of the nadir interval 1530 can be greater than one half the duration 1514 of the first peak interval 1510. Said another way, in some embodiments, the duration 1534 the nadir interval 1530 can be in a range of between 0.5 and 30 times the duration of the first peak interval 1510. In other embodiments, the duration 1534 the nadir interval 1530 can be in a range of between 0.75 and 20 times the duration of the first peak interval 1510. In yet other embodiments, the duration 1534 the nadir interval 1530 can be in a range of between 0.75 and 10 times the duration of the first peak interval 1510. In yet other embodiments, the duration 1534 the nadir interval 1530 can be in a range of between 0.5 and 2 times the duration of the first peak interval 1510. Additionally, in some embodiments, the magnitude 1532 of the nadir interval 1530 is a nonzero magnitude. For example, in some embodiments, the magnitude 1532 of the nadir interval 1530 is in a range of 5% to 75% of a magnitude 1512 of the first peak interval 1510. In other embodiments, the magnitude 1532 of the nadir interval 1530 is in a range of 15% to 75% of a magnitude 1512 of the first peak interval 1510. In yet other embodiments, the magnitude 1532 of the nadir interval 1530 is in a range of 25% to 50% of a magnitude 1512 of the first peak interval 1510. The magnitude of the nadir interval can be of any suitable voltage value, for example, within a range of 1 kilovolt to 50 kilovolts. In contrast, in some embodiments the first peak interval 1510 is a first peak magnitude 1512 is in a range of between 5 kilovolts and 100 kilovolts. In some embodiments, the first peak interval 1510 has a first peak magnitude 1512 that is greater than an average magnitude 1532 of the nadir interval 1530. In some embodiments, the first peak magnitude 1512 is greater than a combined average magnitude 1532 across each nadir interval 1530 of the pulse waveform 1500.

Figure 8:
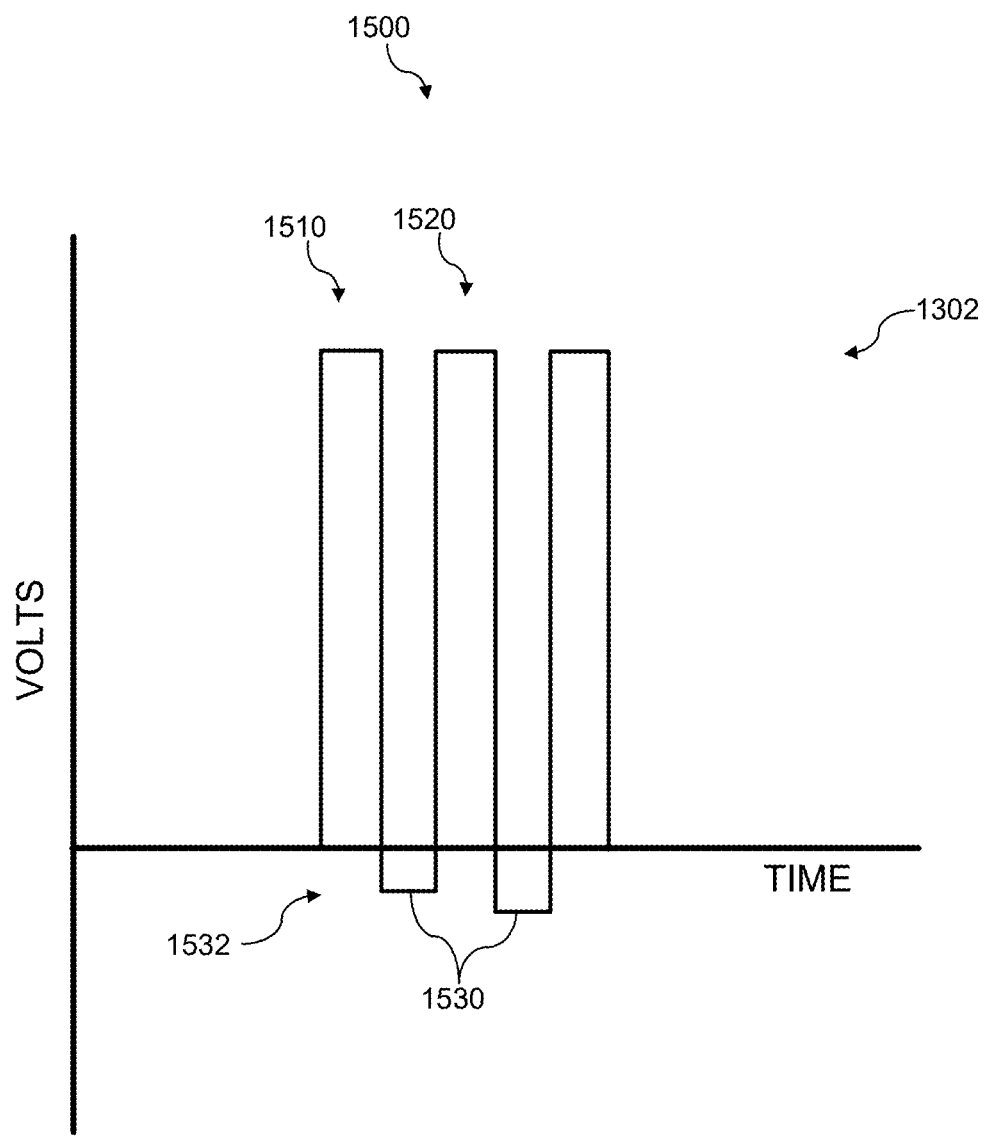
FIG. 8 is a graphical representation of a single pulse of the dose of energy with a pulse waveform according to an embodiment.
Figure 9:
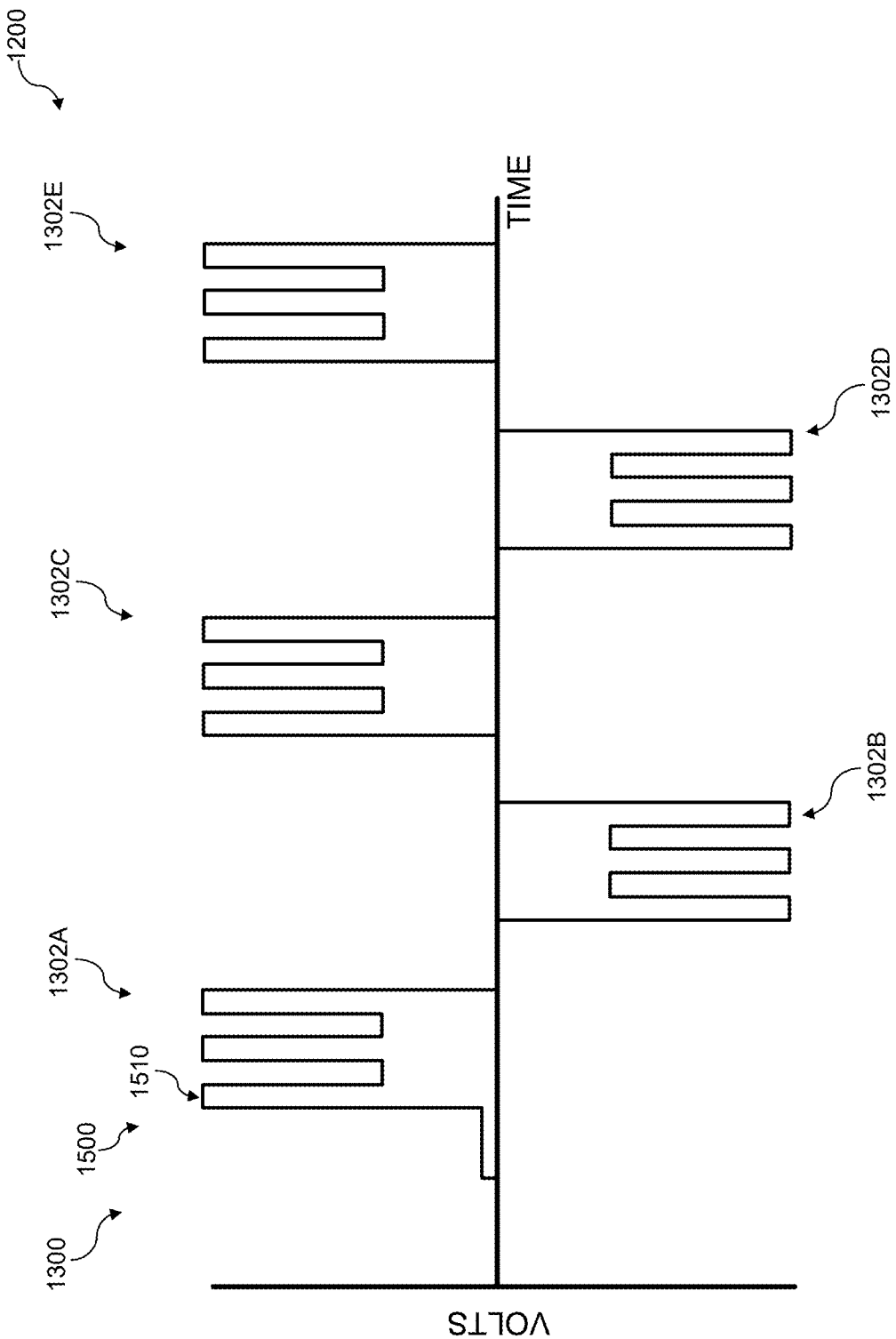
FIG. 9 is a graphical representation of a biphasic dose of energy that includes a set of pulses that each have a pulse waveform according to an embodiment.

As depicted in FIG. 8, in some embodiments, in some embodiments, the magnitude 1532 of the nadir interval 1530 is a negative magnitude. Establishing the magnitude 1532 of the nadir interval 1530 at a negative magnitude can reduce a parasitic capacitance of the electrode catheter (e.g., electric catheter 1110). The reduced parasitic capacitance can facilitate delivery of the peak intervals at high voltages sufficient to produce the permeability effect within the target tissue. In some embodiments, the pulse waveform 1500 includes more than one nadir interval 1530 and the magnitude 1532 of each nadir interval has an increasing negative magnitude 1532 relative to each preceding nadir interval 1530. The increasing negative magnitude 1532 can, for example, further reduce parasitic capacitance during the pulse duration 1320 of a single pulse 1302. The delivery of the peak intervals at high voltages sufficient to produce the permeability effect within the target tissue can also be facilitated by shaping the pulse waveform 1500, as depicted in FIG. 9, to include a pre-polarization interval 1502 that precedes the first peak interval 1510.

The dose of energy 1200 depicted in FIG. 5 is a monophasic dose of energy. However, in some embodiments, a dose of energy 1200 is a biphasic dose of energy as depicted in FIG. 9. Accordingly, in some embodiments, a first pulse 1302A of the plurality of pulses 1300 can have a net positive voltage. A succeeding second pulse 1302B can have a net negative voltage. A succeeding third pulse 1302C can have a net positive voltage. This alternating pattern of net positive voltages and net negative voltages can be repeated for the remaining pulses (e.g., pulses 1302D and 1302E of a five-pulse dose of energy 1200, as depicted). Said another way, in some embodiments, the plurality of pulses 1300 can have a symmetric amplitude and an asymmetric phase. As depicted in both FIGS. 5 and 9, the pulse waveform 1500 for each pulse 1302 of the plurality of pulses 1300 can be shaped such that each pulse 1302 has a net non-zero voltage.

Referring again to FIGS. 5 and 6, in some embodiments, the first peak interval 1510 has a first peak magnitude 1512 that is substantially equal to the maximal pulse magnitude 1310 of the pulse waveform 1500. Said another way, at least the first peak interval 1510 can be delivered at the same high voltage magnitude as the reference pulse 1304. In some embodiments, such as depicted in FIGS. 5 and 6, each peak interval of each pulse 1302 of the plurality of pulses can have a peak magnitude that is substantially equal to the maximal pulse magnitude 1310 of the pulse waveform 1500. In such embodiments, the reduction in the total joule energy of each pulse 1302 results from the reduction in the voltage magnitude associated with the nadir intervals 1530 (e.g., the crenellated waveform 1500 depicted in FIG. 6).

In some embodiments, the pulse waveform 1500 can include a plurality of nadir intervals 1570 with each nadir interval 1530 being positioned between a different pair of peak intervals. Said another way, each sequentially adjacent pair of peak intervals is separated by one of the nadir intervals 1530. Said yet another way, each peak interval of a plurality of peak intervals 1560 of the pulse waveform 1500 is separated from every other peak interval by one of the nadir intervals 1530 of the plurality of nadir intervals 1570.

Figure 10:
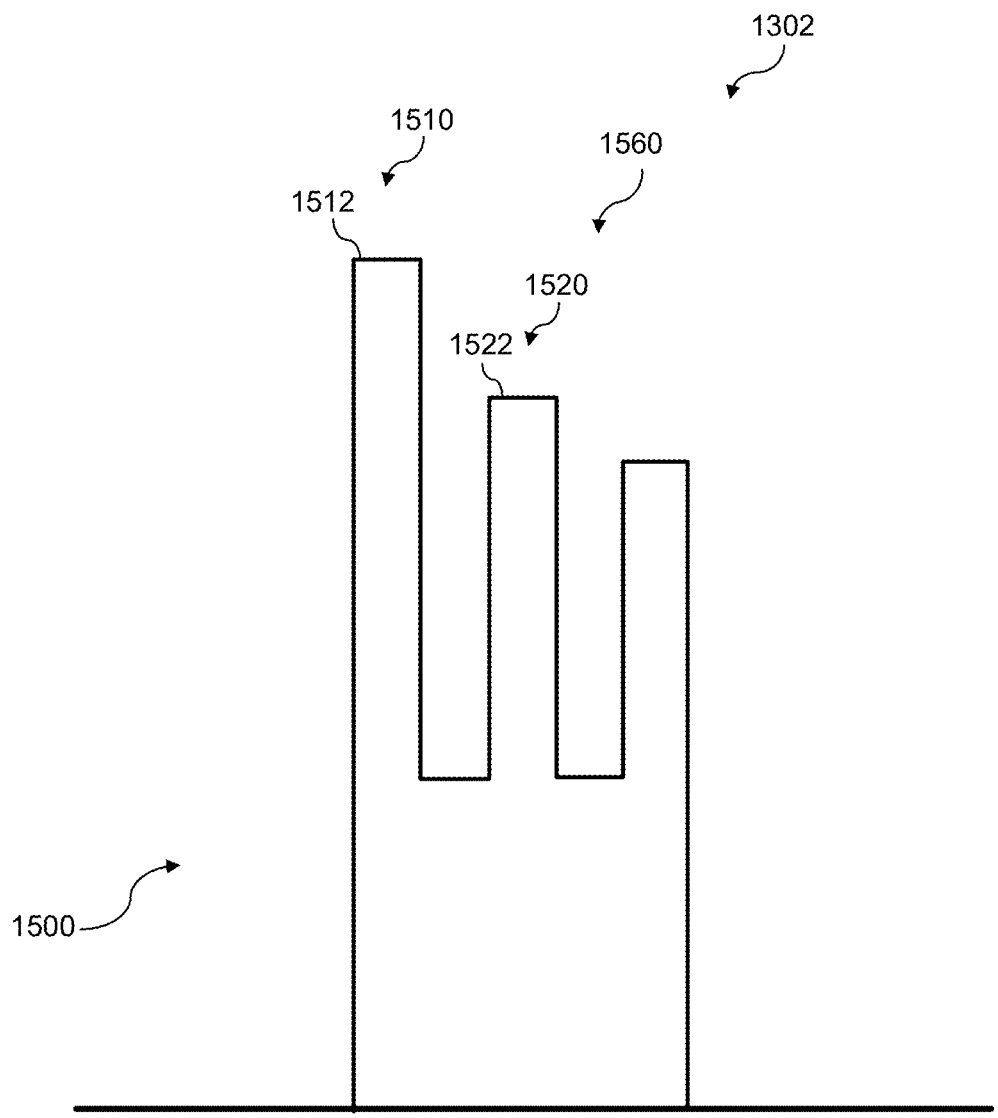
FIG. 10 is a graphical representation of a single pulse of the dose of energy with a pulse waveform according to an embodiment.

FIG. 10 is a graphical representation of a single pulse 1302 of the titrated dose of energy 1200 depicting an embodiment pulse waveform 1500 according to an embodiment. In this embodiment, the pulse waveform 1500 is shaped such that each peak interval (e.g. the second peak of a 1520) of the plurality of peak intervals 1560 has a peak magnitude (e.g., the second peak magnitude 1522) that is less than the peak magnitude (e.g., the first peak magnitude 1512) of the preceding peak interval (the first peak interval 1510) of the plurality of peak intervals 1560. The depicted waveform 1500 can be used to further reduce the total joule energy delivered even relative to the total joule energy of waveform 1500 depicted in FIG. 6. The pulse waveform 1500 depicted in FIG. 10 can produce the desired permeability effect in the target tissue since returning a pore of the cell wall to a substantially open state from a partially closed state can require a lower maximal voltage than is required to transition the pore from a closed state to the substantially open state.

Figure 11:
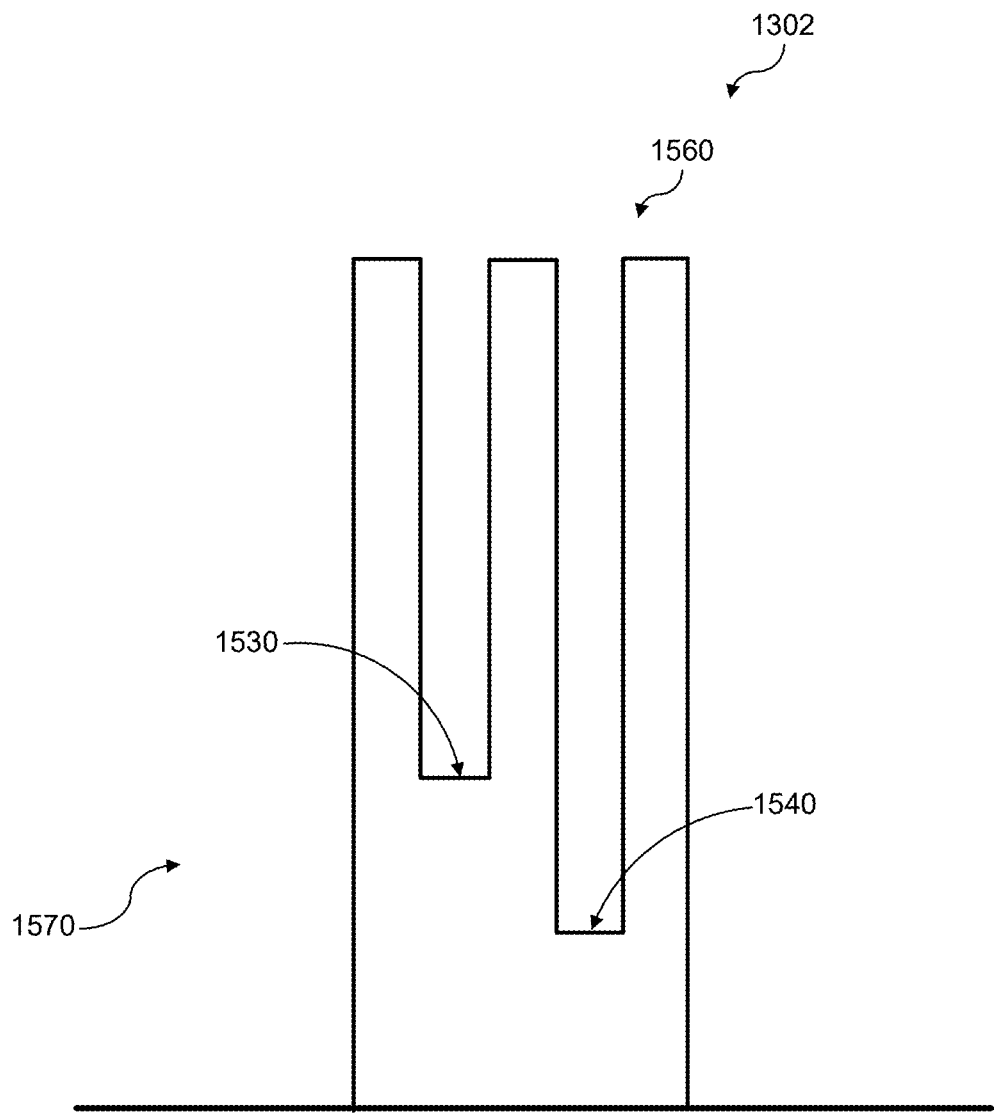
FIG. 11 is a graphical representation of a single pulse of the dose of energy with a pulse waveform according to an embodiment.
Figure 12:
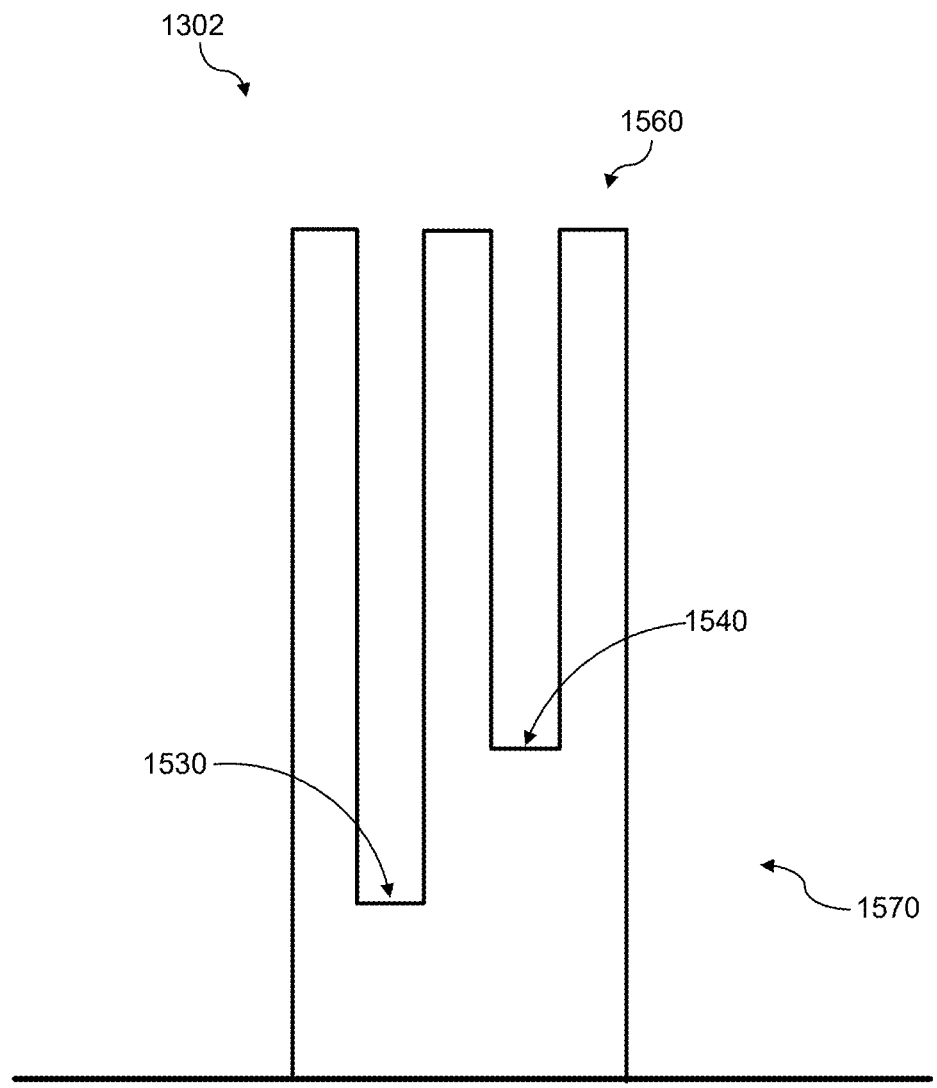
FIG. 12 is a graphical representation of a single pulse of the dose of energy with a pulse waveform according to an embodiment.

FIG. 11 is a graphical representation of a single pulse 1302 of the titrated dose of energy 1200 depicting another embodiment pulse waveform 1500. In this embodiment, the pulse waveform 1500 is shaped such that the magnitude of each nadir interval (e.g., the second nadir interval 1540) of the plurality of nadir intervals 1570 is less than the magnitude of the preceding nadir interval (e.g., the first nadir interval 1530 of the plurality of nadir intervals 1570). However, in some embodiments, such as depicted in FIG. 12, the pulse waveform 1500 is shaped such that the magnitude of each nadir interval (e.g., the second nadir interval 1540) of the plurality of nadir intervals 1570 is greater than the magnitude of the preceding nadir interval (e.g., the first nadir interval 1530 of the plurality of nadir intervals 1570).

Figure 13:
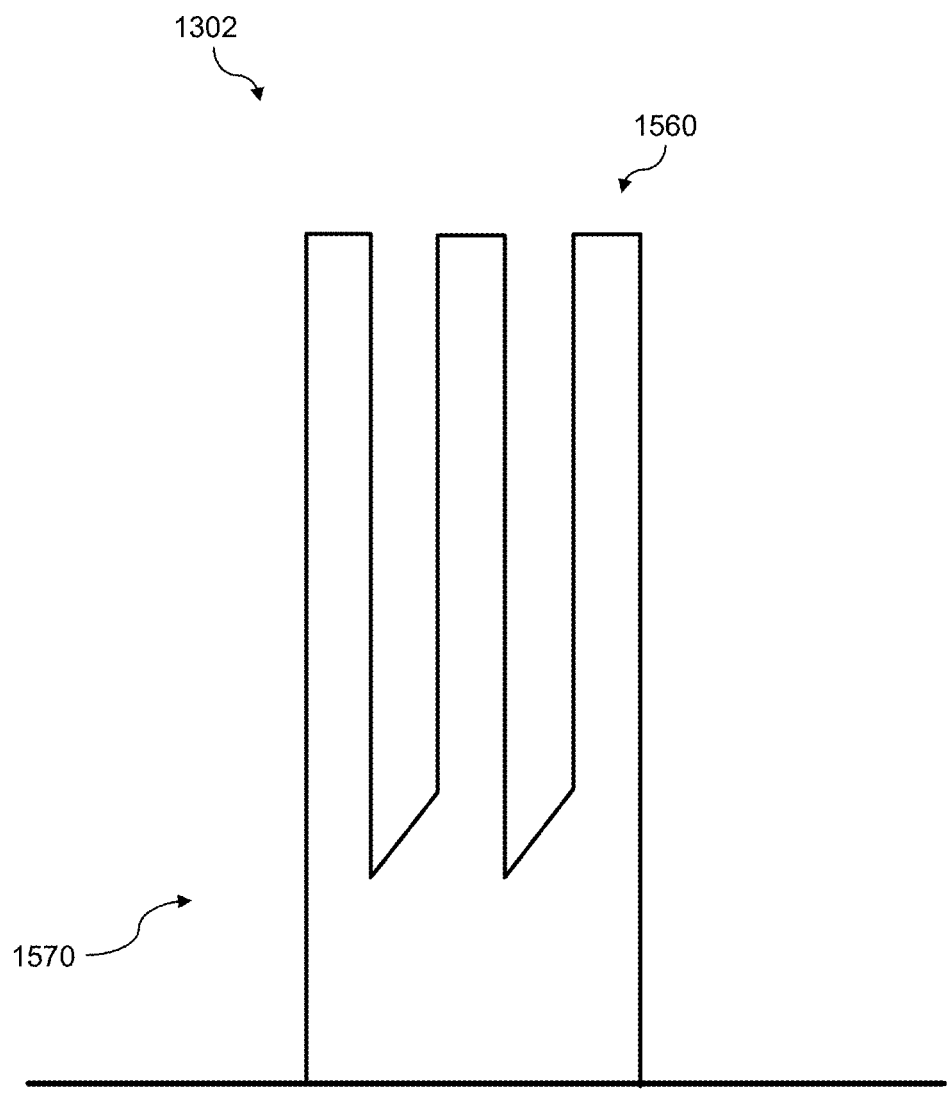
FIG. 13 is a graphical representation of a single pulse of the dose of energy with a pulse waveform according to an embodiment.

FIG. 13 is a graphical representation of a single pulse 1302 of the titrated dose of energy 1200 depicting an embodiment pulse waveform 1500. In embodiments, such as depicted, the pulse waveform 1500 is shaped such that the magnitude of each nadir interval of the plurality of nadir intervals 1570 increases during the duration of each nadir interval.

As depicted in FIGS. 5 and 9, in some embodiments the plurality of pulses 1300 of the dose of energy 1200 includes five individual pulses 1302 that are each shaped by the pulse waveform 1500. The waveform 1500 can be shaped such that the pulse duration 1320 of each pulse 1302 is in a range of 1 microsecond to 100 microseconds. In some embodiments, each pulse 1302 of the plurality pulses 1300 is delivered at a period of one every 30 microseconds. Said another way, a first frequency of the dose of energy 1200 corresponding to the plurality of pulses 1300 can have a period in a range of 25 microseconds to 35 microseconds.

In some embodiments, the initiation of each pulse 1302 plurality of pulses 1300 of the dose of energy 1200 can correspond to an oscillation frequency of a bubble formed in response to at least one pulse 1302. FIGS. 14A-14D are schematic illustrations of an oscillation frequency of a bubble 1220 formed in response to one pulse 1302. Specifically, in use the electrode catheter 1110 can be disposed in a liquid (e.g., bodily fluid, saline) within the body during a method of treatment. Being disposed in a liquid, the high-voltage energy delivered by the electrode catheter 1110 transitions a portion of the liquid adjacent to the outer electrode 1112 to a plasma state, which then expands, as a bubble 1220, to a maximum volume prior to collapsing. Accordingly, the oscillation frequency of the bubble 1220 includes a bubble initiation, a growth interval, and a collapse interval. The depicted step A (FIG. 14A) is representative of the bubble initiation phase, which corresponds to the delivery of the first peak interval 1510 of a first pulse 1302 of the plurality of pulses 1300. As depicted at step B (FIG. 14B), the growth interval corresponds to an expansion of a volume of the bubble 1220 following the bubble initiation. The growth interval continues until the bubble 1220 is at its maximum bubble volume and the growth interval transitions to a collapse interval at step C (FIG. 14C). In certain conditions the bubble 1220 can form within about 3 to 50 μsec. In other conditions the bubble 1220 can form within about 5 to 30 μsec. The collapse interval corresponds to a contraction of the bubble from the maximal bubble volume to a collapsed state as depicted at step D (FIG. 14D). In some embodiments, a second pulse 1302 of the plurality of pulses 1300 is initiated on a condition that between 80% and 95% of the collapse interval has elapsed. In other words, the second pulse 1302 is initiated at a point between step C and step D. It should be appreciated that initiating each subsequent pulse 1302 of the plurality of pulses 1300 ensures that at least the outer electrode 1112 is in contact with the surrounding liquid rather than a bubble of plasma. This, in turn, facilitates the transmission of the high-voltage discharge of the pulse 1302 to the target tissue.

In some embodiments, the permeability effect PE produced by the pulse waveform 1500 within the target tissue corresponds to an oxidative stress produced within the cell wall 1600 (e.g., cellular membrane) of a cell of the target tissue. In some embodiments, the pulse waveform 1500 can be configured to produce (and/or enhance the production of) the oxidative stress in conjunction with producing the electroporation (i.e., Maxwell stress) described previously with reference to FIG. 4 thereby increasing the overall effect on the target tissue. In some embodiments, the oxidative stress alone, or in combination with the electroporation can produce a permeability effect that is greater than the permeability effect that would otherwise be created by the delivery of a reference pulse 1304.

As depicted in FIGS. 15A and 15B, in some embodiments, the oxidative stress corresponds to an oxidation-reduction reaction within the lipid bilayer 1606 of the cell wall 1600. Said another way, the delivery of the plurality of peak intervals 1560 aligns a plurality of polarized molecules 1604 of a cell of the target tissue thereby amplifying a local electrical field. The amplification of the local electrical field develops a peroxidation of a plurality of the saturated bonds of a plurality of hydrophilic lipid chains 1608 as depicted at step B (FIG. 15B). In other words, the local electrical field degrades a portion of the saturated bonds such that the porosity of the cell wall is increased regardless of (or independent of) the state of the pore 1602 (e.g., a protein channel or transmembrane protein). However, as depicted in FIG. 15B, in some embodiments, the permeability effect produced by the pulse waveform 1500 can include both the oxidative stress and the electroporation such that the permeability of the cell wall is increased to a greater magnitude than would be encountered in response to a single permeability effect.

In some embodiments, the dose of energy 1200 can have a first frequency that is an occurrence frequency associated with each pulse 1302 of the plurality of pulses 1300 of the dose of energy 1200. Referring to FIG. 5, the first frequency is the inverse of the period 1321. In some embodiments, the first frequency can be less than 1 MHz. Specifically, in some embodiments, the first frequency can be between 10 kHz and 500 kHz. In some embodiments, the first frequency can be between 50 kHz and 300 kHz. In yet other embodiments, the first frequency can be between 100 kHz and 200 kHz. For a pulse 1302 shaped by the pulse waveform 1500, the plurality of peak intervals 1570 within each pulse is at a second frequency. The second frequency is higher than the first frequency and can be within a range that facilitates development of an oxidative stress within the target tissue.

Figure 16:
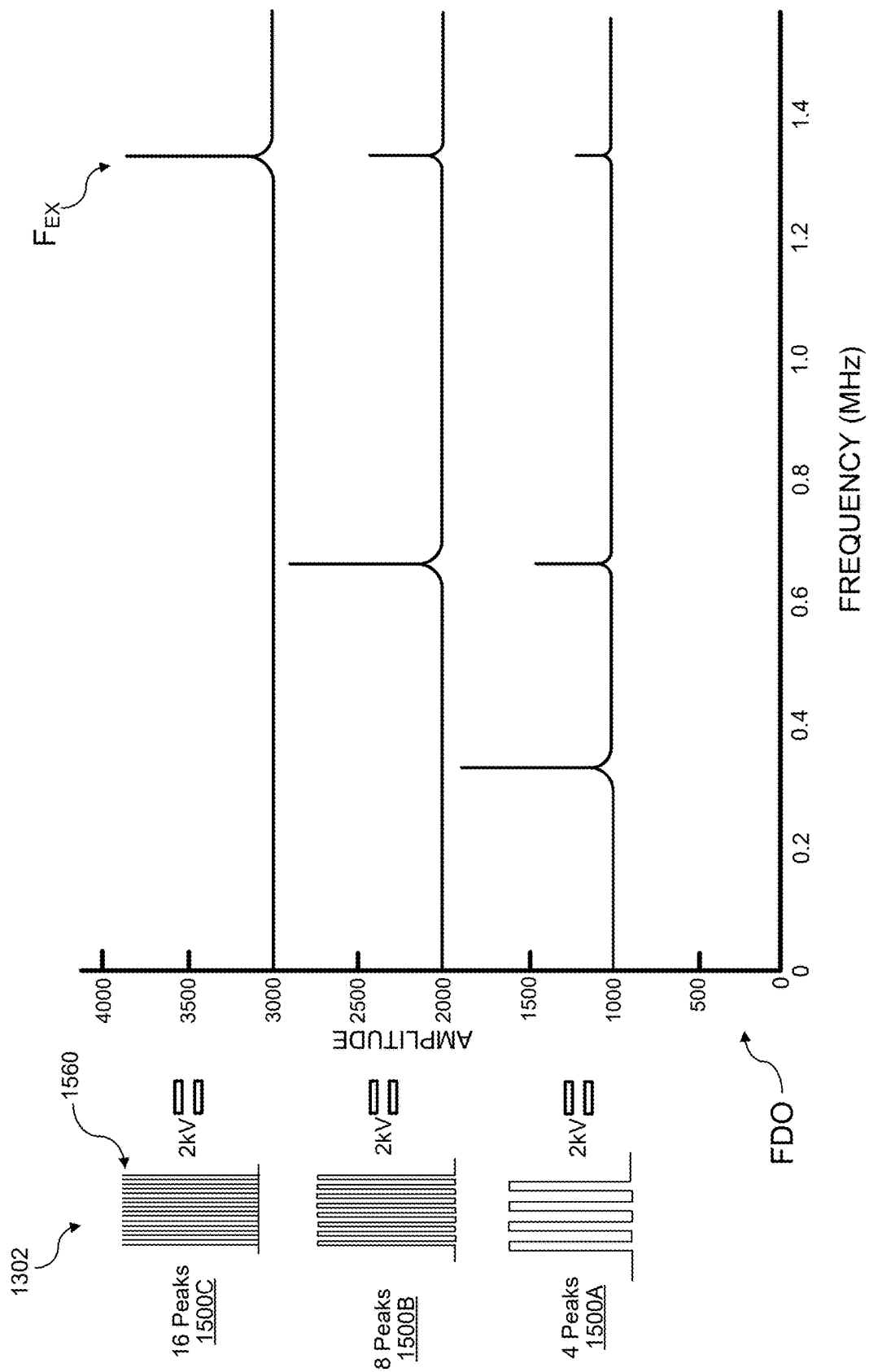
FIG. 16 is a schematic illustration of three alternative pulse waveforms of a single pulse of dose of energy and three frequency-domain graphs of the pulse waveform of the single pulse according to various embodiments.

As depicted in FIG. 16, the pulse waveform 1500 of pulses 1302 can be described by a frequency domain output FDO of a fast Fourier transform. Accordingly, in some embodiments, the second frequency is an excitation frequency FEX (e.g., a component frequency) of the frequency domain output FDO demonstrated to effectively produce the oxidative stress to enhance permeability. The excitation frequency FEX can, for example, be a high frequency component of the frequency domain output FDO. In some embodiments, the excitation frequency FEX of the plurality of peak intervals 1560 is within a range of 1.2 megahertz to 1.4 megahertz. For example, an excitation frequency of between 1.30 megahertz and 1.36 megahertz has been shown to increase oxidative stress relative to other frequency bands. Without being bound by theory, the greater the amplitude of the excitation frequency FEX in the designated range, the greater the oxidative stress produced in the target tissue. Thus, the crenelated waveforms described herein can reduce the total energy delivered while also being tailored to enhance the development of the oxidative stress.

Because the fast Fourier transform converts the time-domain representation of the pulse waveform 1500 to a frequency-domain representation, increasing the number of peak intervals within the plurality of peak intervals 1560 at a given voltage output increases the amplitude of the high frequency excitation frequency FEX of the frequency domain output FDO. Accordingly, in some embodiments, the plurality of peak intervals 1560 can include at least 3 peak intervals and less than 300 peak intervals within a pulse duration and a range of 0.2 microseconds to 20 microseconds.

FIG. 16 graphically illustrates the effect of increasing the number of peak intervals of the plurality of peak intervals 1560 during the pulse duration of a single pulse. Specifically, FIG. 16 is a schematic illustration of three alternative pulse waveforms and the corresponding frequency-domain graph of each alternative pulse waveform. Each of the depicted pulse waveforms 1500A, 1500B, and 1500C have a pulse duration of 10 microseconds and a maximal pulse magnitude of 2 kilovolts. As depicted, the first pulse waveform 1500A includes four peak intervals with three interspersed nadir intervals. Each of the peak intervals has a peak duration of 1 microsecond and each nadir interval has a duration of 2 microseconds. Describing the first pulse waveform 1500A as a frequency domain output FDO of a fast Fourier transform reveals an excitation frequency FEX (at approximately 1.4 MHZ) with an amplitude that is greater than 1.0 kilovolt and less than 1.5 kilovolts. As further depicted, the second pulse waveform 1500B includes eight peak intervals with seven interspersed nadir intervals. Each of the peak intervals has a peak duration of 500 nanoseconds and each nadir interval has a duration of 1 microsecond. Describing the second pulse waveform 1500B as a frequency domain output FDO of a fast Fourier transform reveals an excitation frequency FEX (at approximately 1.4 MHz) with an amplitude that is greater than 2.0 kilovolts and less than 2.5 kilovolts. Finally, as further depicted, the third pulse waveform 1500C includes 16 peak intervals with 15 interspersed nadir intervals. Each of the peak intervals has a peak duration of 250 nanoseconds and each nadir interval has a duration of 500 nanoseconds. Describing the third pulse waveform 1500C as a frequency domain output FDO of a fast Fourier transform reveals an excitation frequency FEX (at approximately 1.4 MHZ) with an amplitude that is greater than 3.5 kilovolts and less than 4.0 kilovolts. Of the three alternative pulse waveforms depicted, the third pulse waveform 1500C can be described as having the excitation frequency FEX with the greatest magnitude and corresponding production of oxidative stress within the target tissue.

Figure 17:
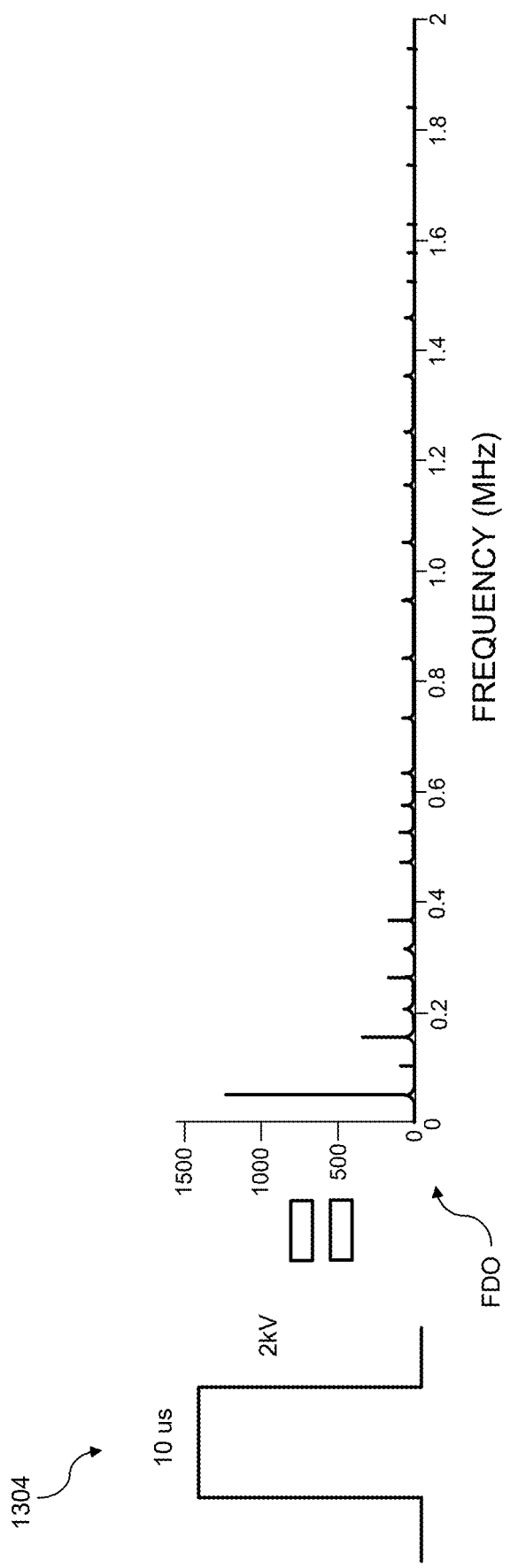
FIG. 17 is a schematic illustration of a pulse waveform of a single reference pulse of the dose of energy of FIG. 3 and a frequency-domain graph descriptive of the reference pulse.

As depicted in FIG. 17, the square waveform of a reference pulse 1304 can be described by a frequency domain output FDO of a fast Fourier transform. Due to the square waveform, the reference pulse 1304 has a single peak interval. Accordingly, when described by the frequency domain output FDO the component frequencies within the range of 1.30 megahertz to 1.36 megahertz lack sufficient magnitude to increase the oxidative stress within the target tissue. In fact, the maximum amplitude is less than 0.2 MHz. Said another way, the fast Fourier transform description of the square waveform of the reference pulse 1304 has an absence of an excitation frequency in the designated range of sufficient magnitude to increase the permeability of a cell of the target tissue via oxidative stress.

In some embodiments, where the desired permeability effect produced by the waveform 1500 within the target tissue is produced in response to an increase in the oxidative stress within the target tissue, the dose of energy 1200 includes the plurality of pulses 1300 delivered at a first frequency. At least one pulse 1302 of the plurality of pulses 1300 includes the pulse waveform 1500. The pulse waveform 1500 includes, within the pulse duration 1320, the plurality of peak intervals 1560 and the plurality of nadir intervals 1560. A nadir interval of the plurality of nadir intervals 1570 is disposed between each pair of peak intervals of the plurality of peak intervals 1560. A magnitude of each nadir interval is less than a maximal pulse magnitude of the pulse 1302 and the plurality of peak intervals 1560 is at the second frequency. The second frequency is within a range that develops the oxidative stress in the target tissue. The second frequency can, for example, be a high frequency component of the frequency domain output of a fast Fourier transform of the pulse waveform 1500.

In some embodiments, the second frequency can correspond to an excitation frequency that is descriptive of a voltage rise for each peak interval of the plurality of peak intervals 1560 of the pulse waveform 1500. As used herein, the voltage rise describes both a change (e.g., an increase) in magnitude of the voltage corresponding to the initiation of a peak interval and the rate at which the magnitude change occurs (e.g., the slope of the leading edge of each peak interval of the plurality peak intervals 1560.) Without being bound by theory, a nearly instantaneous voltage rise increases the oxidative stress in the target tissue when repeated during the pulse duration 1320. Said another way, a voltage rise in which the magnitude change is substantially instantaneous (e.g., the slope of leading edge of the peak interval approaches vertical) can correspond to an excitation frequency within a range that develops the oxidative stress in the target tissue (e.g., within a range of 1.30 megahertz to 1.36 megahertz). For example, in some embodiments, each of the peak intervals within the pulse duration 1320 includes a voltage rise in a range of 1 kilovolts to 20 kilovolts to the maximal pulse magnitude and an increase interval in a range of 50 nanoseconds to 150 nanoseconds for each of the peak intervals within the pulse duration 1320. Accordingly, in some embodiments, affecting the target tissue with a pulsed electric field can include determining a voltage rise of each peak interval of the plurality of peak intervals 1560 of the pulse waveform 1500 based on the second frequency of the plurality of peak intervals 1560 and a plurality of attributes of the target tissue.

In some embodiments, both the first frequency and the second frequency are occurrence frequencies. The second frequency can, therefore, correspond to an initiation of each peak interval of the plurality of peak intervals 1560 of the at least one pulse 1302 of the plurality of pulses 1300. As an occurrence frequency, the second frequency of the plurality of peak intervals can be within a range that develops an oxidative stress within the target tissue. In some embodiments, the first frequency can have a period in a range of 25 microseconds to 35 microseconds. The second frequency can, on the other hand, be in a range of 1.5 to 5 times the first frequency. For example, the second frequency can be in a range of 250 MHz to 0.8 MHz with a period in the range of 4 nanoseconds to 1,250 nanoseconds. In other words, the occurrence of the initiation of each peak interval of the plurality of peak intervals 1560 can be in a range of 250 MHz to 0.8 MHz with a period in the range of 4 nanoseconds to 1,250 nanoseconds.

In some embodiments, it may be desirable to increase the permeability of a cell of the target tissue via more than one permeability effect. Accordingly, in some embodiments, the dose of energy 1200 includes the plurality of pulses at the first frequency and the pulse waveform 1500 includes, within the pulse duration, the plurality of peak intervals 1560 at the second frequency, which is within a range that enhances production of an oxidation reaction within the target tissue. Additionally, the pulse waveform includes the plurality of nadir intervals 1570 with the nadir intervals disposed between each pair of peak intervals. The duration 1534 of the nadir intervals is less than a restitution interval associated with the target tissue.

In some embodiments, the pulse waveform 1500 is shaped to produce an additive Maxwell stress and an oxidative stress. The oxidative stress produced by the pulse waveform 1500 is greater than an oxidative stress that would be produced by a reference pulse 1304. The Maxwell stress increases a diffusive permeability of at least one cell of the target tissue relative to a state of the at least one cell of the target tissue prior to the delivery of the pulse waveform 1500. The additive Maxwell stress produced by the pulse waveform 1500 substantially equals a Maxwell stress that would otherwise be produced via the delivery of a reference pulse 1304.

Figure 18:
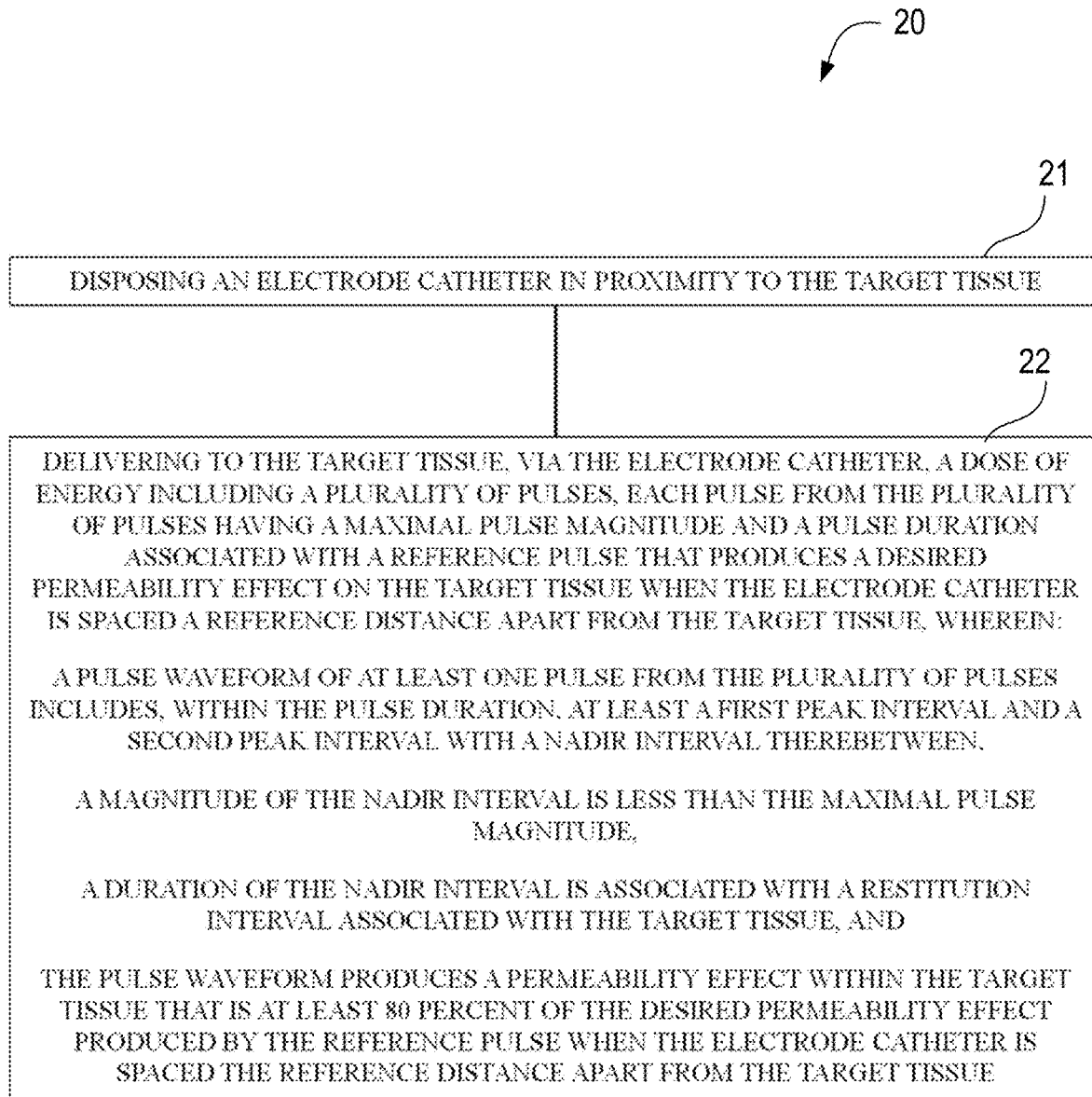
FIG. 18 is a flow chart of a method for treating a target tissue according to an embodiment.

FIG. 18 is a flow chart of a method 20 for treating a target tissue according to an embodiment. The method 20 can be performed via any suitable medical system, such as medical system 1100 as described with reference to FIGS. 1 and 2. However, it should be appreciated that in various embodiments, aspects of the method 20 may be accomplished via additional embodiments of the medical system 1100 or other suitable medical systems. Accordingly, the method 20 can be implemented on any suitable device.

As depicted at 21, the method 20 includes disposing an electrode catheter in proximity to the target tissue. As depicted at 22, the method 20 includes delivering to the target tissue, via the electrode catheter, a dose of energy including a plurality of pulses. Each pulse from the plurality of pulses has a maximal pulse magnitude and a pulse duration associated with a reference pulse that produces a desired permeability effect on the target tissue when the electrode catheter is spaced a reference distance apart from the target tissue. A pulse waveform of at least one pulse from the plurality of pulses includes, within the pulse duration, at least a first peak interval and a second peak interval with a nadir interval therebetween. A magnitude of the nadir interval is less than the maximal pulse magnitude. A duration of the nadir interval is associated with a restitution interval associated with the target tissue. The pulse waveform produces a permeability effect within the target tissue that is at least 80 percent of the desired permeability effect produced by the reference pulse when the electrode catheter is spaced the reference distance apart from the target tissue.

Figure 19:
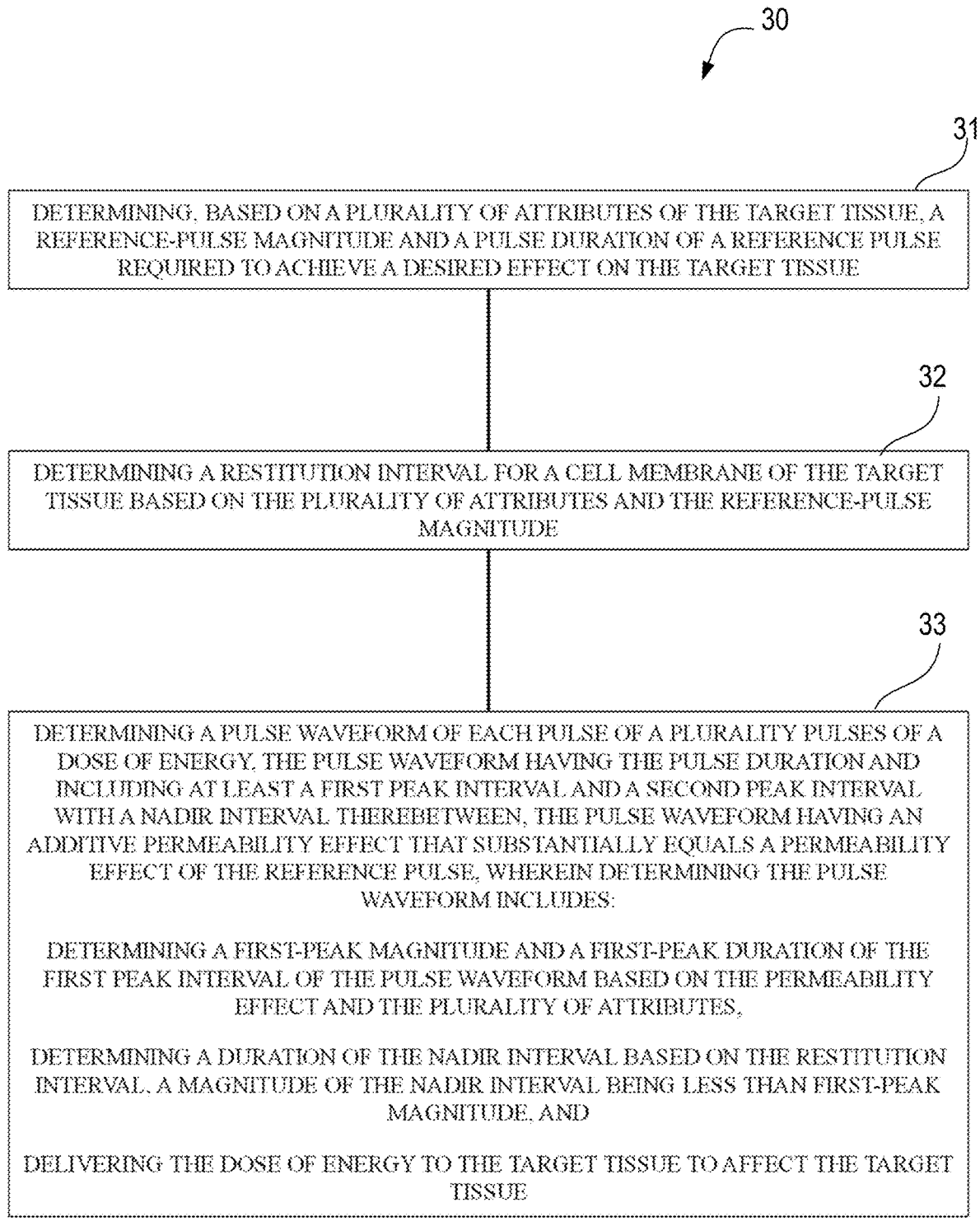
FIG. 19 is a flow chart of a method for affecting a target tissue with a pulsed electric field according to an embodiment.

FIG. 19 is a flow chart of a method 30 for affecting a target tissue with a pulsed electric field according to an embodiment. The method 30 can be performed via any suitable medical system, such as medical system 1100 as described with reference to FIGS. 1 and 2. However, it should be appreciated that in various embodiments, aspects of the method 30 may be accomplished via additional embodiments of the medical system 1100 or other suitable medical systems. Accordingly, the method 30 can be implemented on any suitable device.

As depicted at 31, the method 30 includes determining, based on a plurality of attributes of the target tissue, a reference-pulse magnitude and a pulse duration of a reference pulse required to achieve a desired effect on the target tissue. As depicted at 32, the method 30 includes determining a restitution interval for a cell membrane of the target tissue based on the plurality of attributes and the reference-pulse magnitude. As depicted at 33, the method 30 includes determining a pulse waveform of each pulse of a plurality pulses of a dose of energy. The pulse waveform having the pulse duration and including at least a first peak interval and a second peak interval with a nadir interval therebetween. The pulse waveform having an additive permeability effect that substantially equals a permeability effect of the reference pulse. Determining the pulse waveform includes determining a first-peak magnitude and a first-peak duration of the first peak interval of the pulse waveform based on the permeability effect and the plurality of attributes, determining a duration of the nadir interval based on the restitution interval, a magnitude of the nadir interval being less than first-peak magnitude, and delivering the dose of energy to the target tissue to affect the target tissue.

Figure 20:
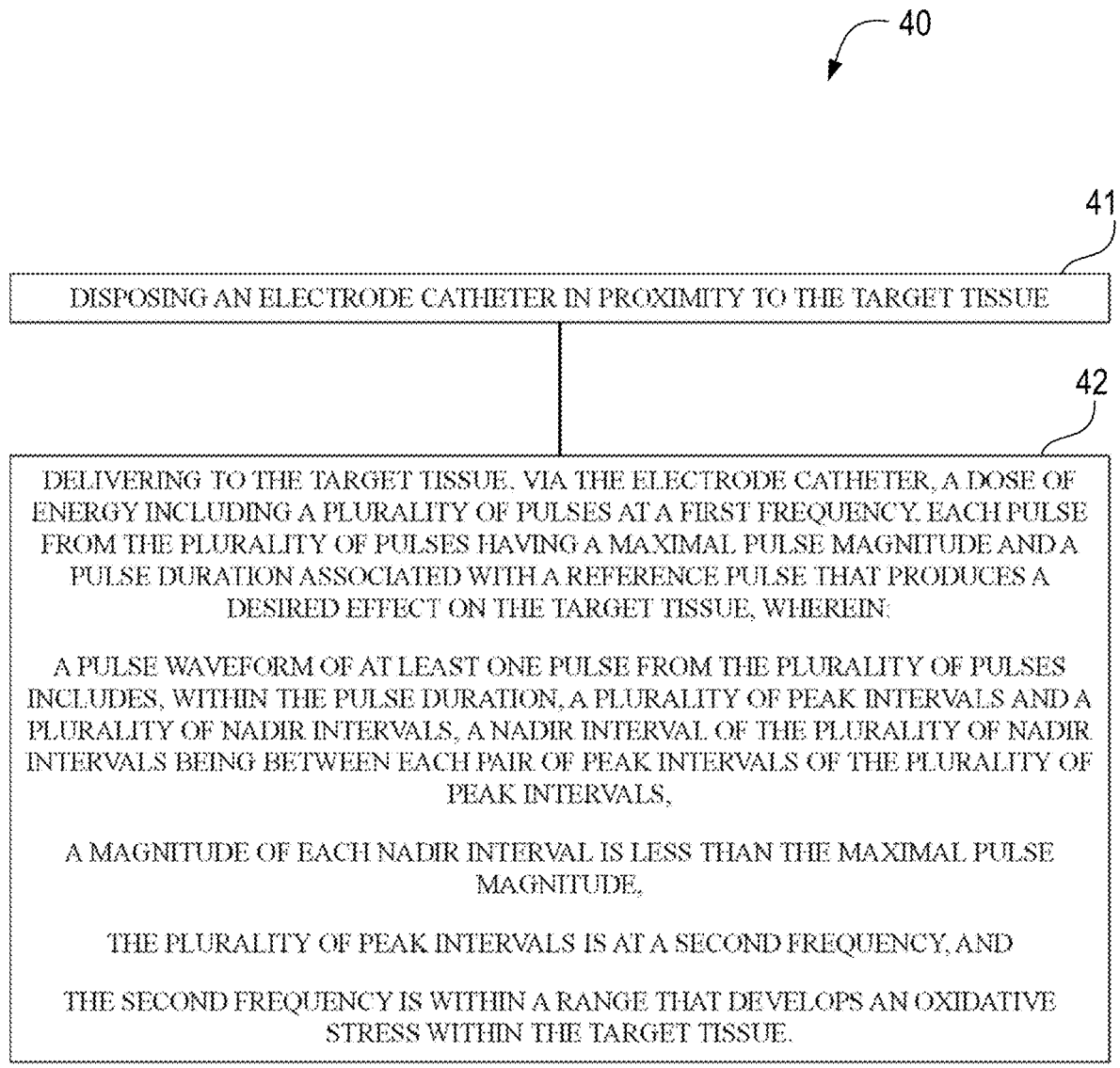
FIG. 20 is a flow chart of a method for treating a target tissue according to an embodiment.

FIG. 20 is a flow chart of a method 40 for treating a target tissue according to an embodiment. The method 40 can be performed via any suitable medical system, such as medical system 1100 as described with reference to FIGS. 1 and 2. However, it should be appreciated that in various embodiments, aspects of the method 40 may be accomplished via additional embodiments of the medical system 1100 or other suitable medical systems. Accordingly, the method 40 can be implemented on any suitable device.

As depicted at 41, the method 40 includes disposing an electrode catheter in proximity to the target tissue. As depicted at 42, the method 40 includes delivering to the target tissue, via the electrode catheter, a dose of energy including a plurality of pulses at a first frequency, each pulse from the plurality of pulses having a maximal pulse magnitude and a pulse duration associated with a reference pulse that produces a desired effect on the target tissue. A pulse waveform of at least one pulse from the plurality of pulses includes, within the pulse duration, a plurality of peak intervals and a plurality of nadir intervals, a nadir interval of the plurality of nadir intervals being between each pair of peak intervals of the plurality of peak intervals. A magnitude of each nadir interval is less than the maximal pulse magnitude. The plurality of peak intervals is at a second frequency. The second frequency is within a range that develops an oxidative stress within the target tissue.

Figure 21:
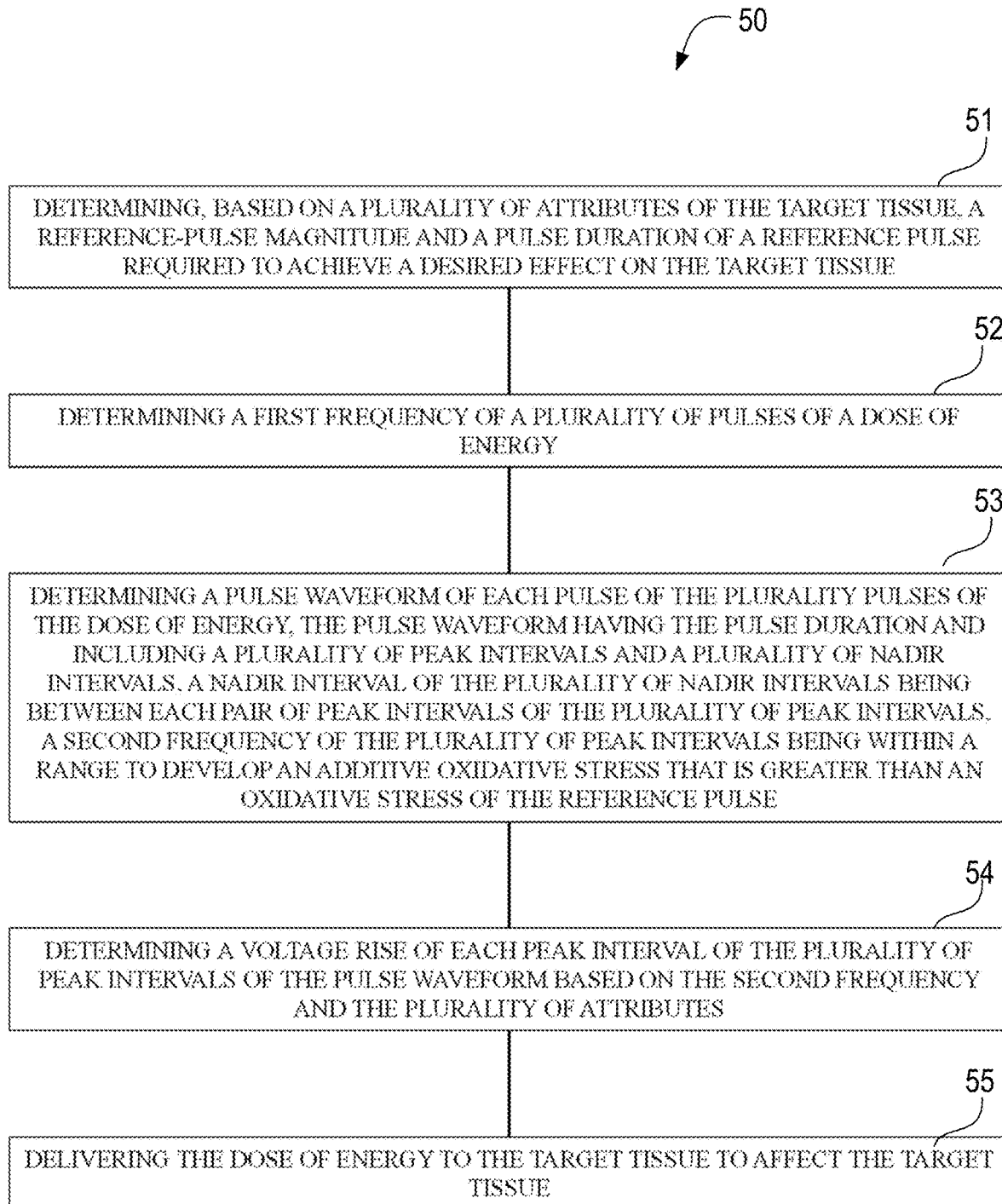
FIG. 21 is a flow chart of a method for affecting a target tissue with a pulsed electric field according to an embodiment.

FIG. 21 is a flow chart of a method 50 for affecting a target tissue with a pulsed electric field according to an embodiment. The method 50 can be performed via any suitable medical system, such as medical system 1100 as described with reference to FIGS. 1 and 2. However, it should be appreciated that in various embodiments, aspects of the method 50 may be accomplished via additional embodiments of the medical system 1100 or other suitable medical systems. Accordingly, the method 50 can be implemented on any suitable device.

As depicted at 51, the method 50 includes determining, based on a plurality of attributes of the target tissue, a reference-pulse magnitude and a pulse duration of a reference pulse required to achieve a desired effect on the target tissue. As depicted at 52, the method 50 includes determining a first frequency of a plurality of pulses of a dose of energy. As depicted at 53, the method 50 includes determining a pulse waveform of each pulse of the plurality pulses of the dose of energy, the pulse waveform having the pulse duration and including a plurality of peak intervals and a plurality of nadir intervals. A nadir interval of the plurality of nadir intervals being between each pair of peak intervals of the plurality of peak intervals. A second frequency of the plurality of peak intervals being within a range to develop an additive oxidative stress that is greater than an oxidative stress of the reference pulse. As depicted at 54, the method 50 includes determining a voltage rise of each peak interval of the plurality of peak intervals of the pulse waveform based on the second frequency and the plurality of attributes. As depicted at 55, the method 50 includes delivering the dose of energy to the target tissue to affect the target tissue.

Figure 22:
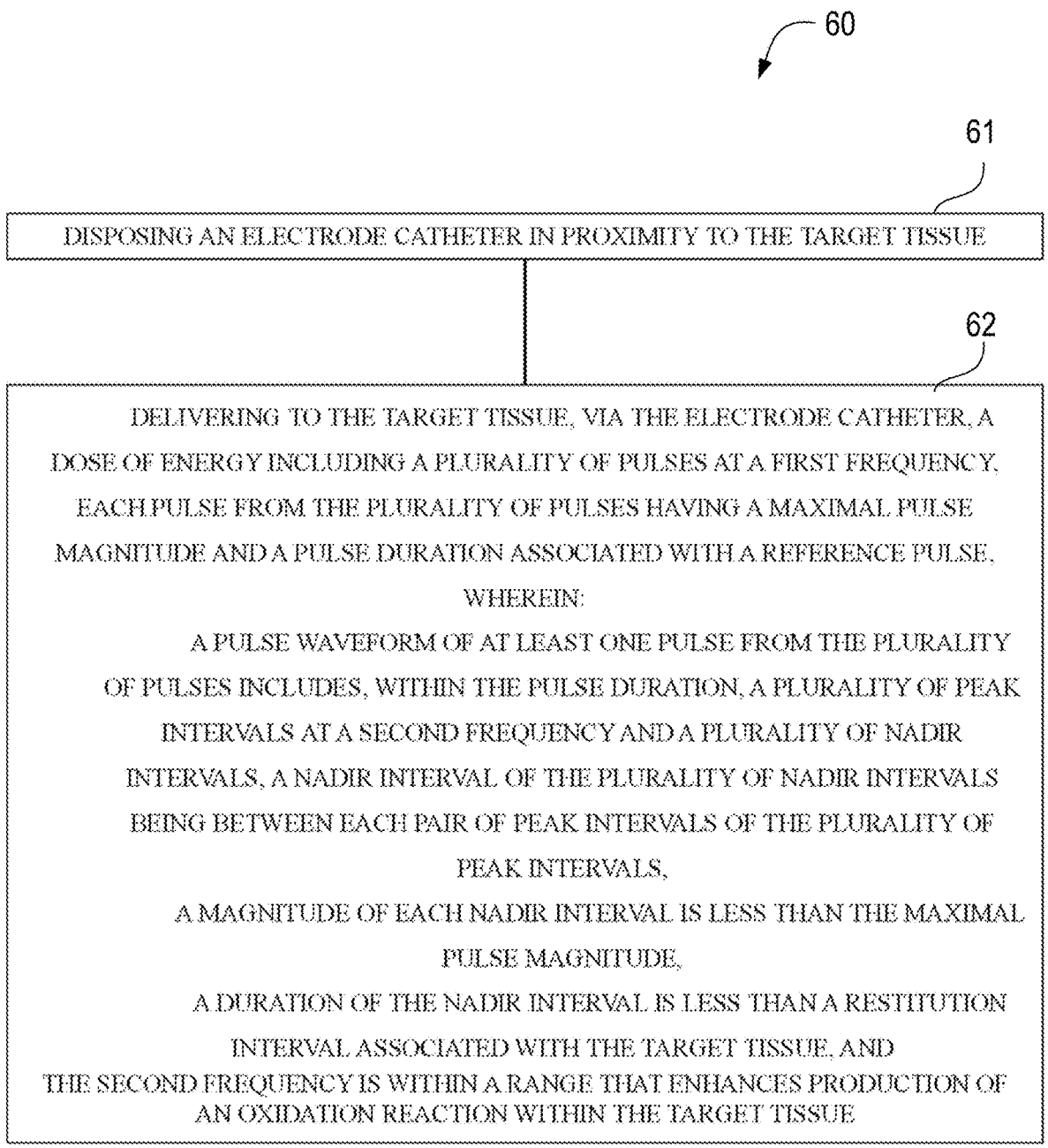
FIG. 22 is a flow chart of a method for treating a target tissue according to an embodiment.

FIG. 22 is a flow chart of a method 60 for treating a target tissue according to an embodiment. The method 60 can be performed via any suitable medical system, such as medical system 1100 as described with reference to FIGS. 1 and 2. However, it should be appreciated that in various embodiments, aspects of the method 60 may be accomplished via additional embodiments of the medical system 1100 or other suitable medical systems. Accordingly, the method 60 can be implemented on any suitable device.

As depicted at 61, the method 60 includes disposing an electrode catheter in proximity to the target tissue. As depicted at 62, the method 60 includes delivering to the target tissue, via the electrode catheter, a dose of energy including a plurality of pulses at a first frequency. Each pulse from the plurality of pulses has a maximal pulse magnitude and a pulse duration associated with a reference pulse. A pulse waveform of at least one pulse from the plurality of pulses includes, within the pulse duration, a plurality of peak intervals at a second frequency and a plurality of nadir intervals, a nadir interval of the plurality of nadir intervals being between each pair of peak intervals of the plurality of peak intervals. A magnitude of each nadir interval is less than the maximal pulse magnitude. A duration of the nadir interval is less than a restitution interval associated with the target tissue. The second frequency is within a range that enhances production of an oxidation reaction within the target tissue.

Figure 23:
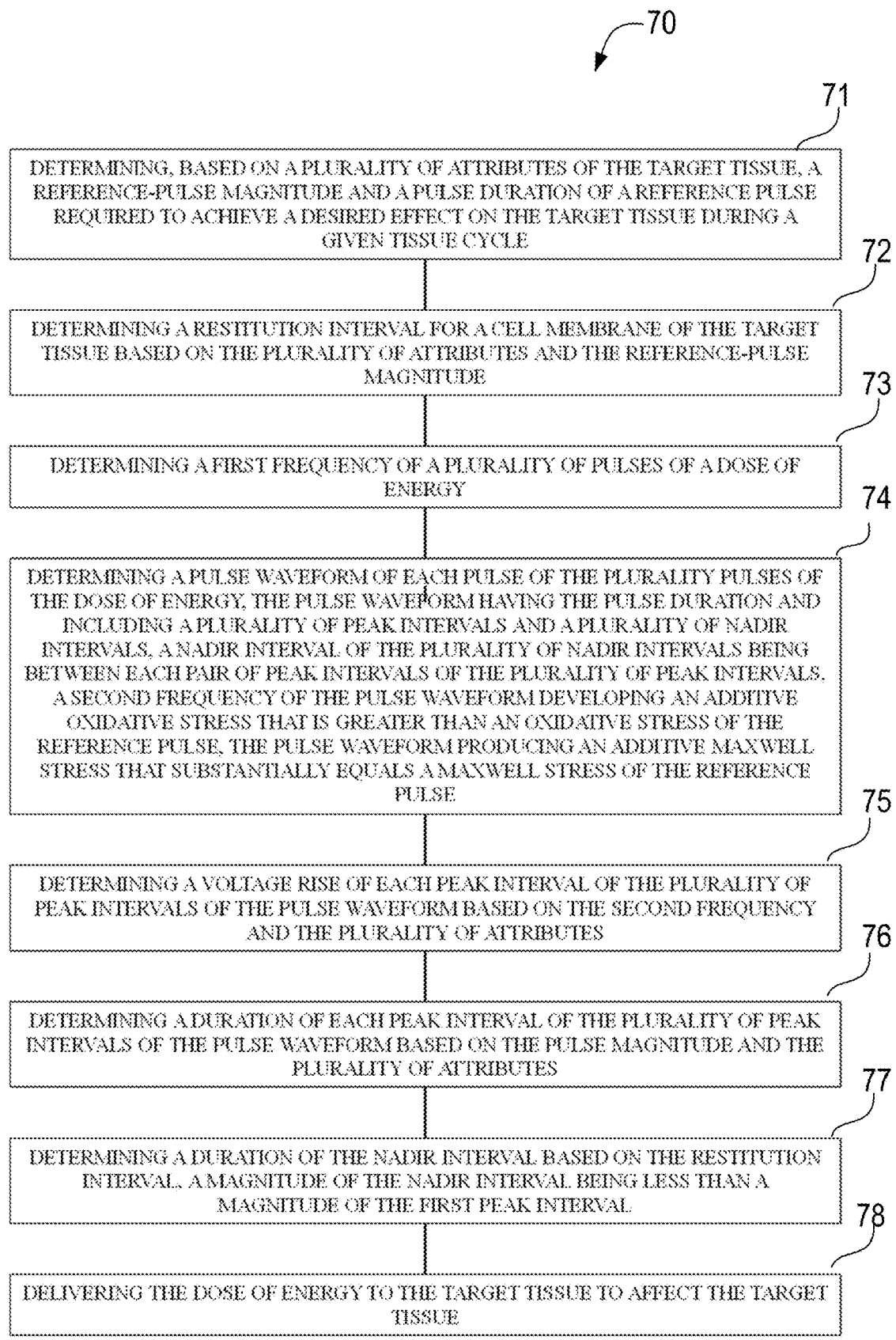
FIG. 23 is a flow chart of a method for affecting a target tissue with a pulsed electric field according to an embodiment.

FIG. 23 is a flow chart of a method 70 for affecting a target tissue with a pulsed electric field according to an embodiment. The method 70 can be performed via any suitable medical system, such as medical system 1100 as described with reference to FIGS. 1 and 2. However, it should be appreciated that in various embodiments, aspects of the method 70 may be accomplished via additional embodiments of the medical system 1100 or other suitable medical systems. Accordingly, the method 70 can be implemented on any suitable device.

As depicted at 71, the method 70 includes determining, based on a plurality of attributes of the target tissue, a reference-pulse magnitude and a pulse duration of a reference pulse required to achieve a desired effect on the target tissue during a given tissue cycle. As depicted at 72, the method 70 includes determining a restitution interval for a cell membrane of the target tissue based on the plurality of attributes and the reference-pulse magnitude. As depicted at 73, the method 70 includes determining a first frequency of a plurality of pulses of a dose of energy. As depicted at 74, the method 70 includes determining a pulse waveform of each pulse of the plurality pulses of the dose of energy. The pulse waveform having the pulse duration and including a plurality of peak intervals and a plurality of nadir intervals. A nadir interval of the plurality of nadir intervals being between each pair of peak intervals of the plurality of peak intervals. A second frequency of the pulse waveform developing an additive oxidative stress that is greater than an oxidative stress of the reference pulse. The pulse waveform producing an additive Maxwell stress that substantially equals a Maxwell stress of the reference pulse. As depicted at 75, the method 70 includes determining a voltage rise of each peak interval of the plurality of peak intervals of the pulse waveform based on the second frequency and the plurality of attributes. As depicted at 76, the method 70 includes determining a duration of each peak interval of the plurality of peak intervals of the pulse waveform based on the pulse magnitude and the plurality of attributes. As depicted at 77, the method 70 includes determining a duration of the nadir interval based on the restitution interval, a magnitude of the nadir interval being less than a magnitude of the first peak interval. As depicted at 78, the method 70 includes delivering the dose of energy to the target tissue to affect the target tissue.

Figure 24:
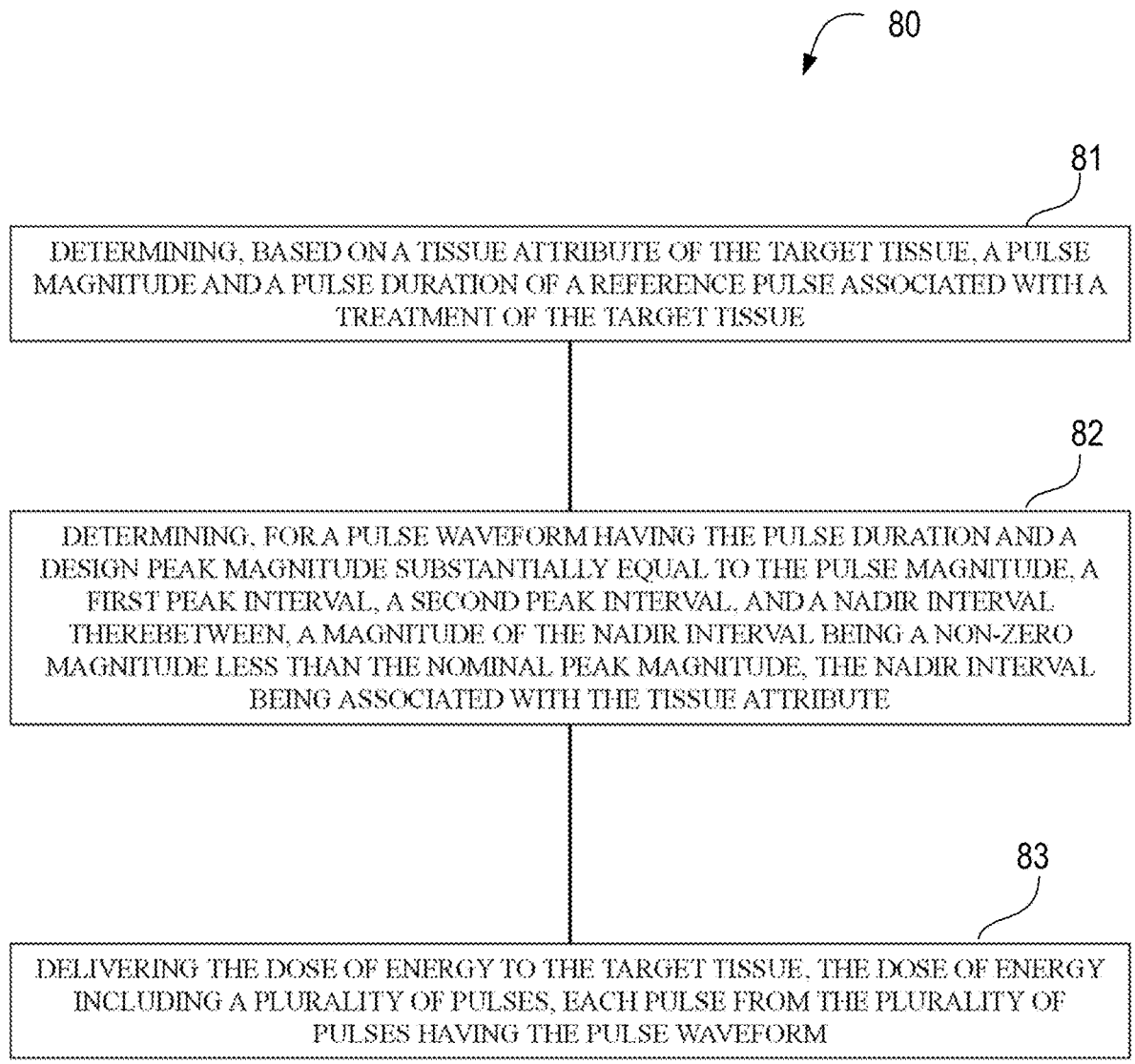
FIG. 24 is a flow chart of a method of delivering a dose energy to a target tissue according to an embodiment.

FIG. 24 is a flow chart of a method 80 for affecting a target tissue with a pulsed electric field according to an embodiment. The method 80 can be performed via any suitable medical system, such as medical system 1100 as described with reference to FIGS. 1 and 2. However, it should be appreciated that in various embodiments, aspects of the method 80 may be accomplished via additional embodiments of the medical system 1100 or other suitable medical systems. Accordingly, the method 80 can be implemented on any suitable device.

As depicted at 81, the method 80 includes determining, based on a tissue attribute of the target tissue, a pulse magnitude and a pulse duration of a reference pulse associated with a treatment of the target tissue. As depicted 82, the method 80 includes determining, for a pulse waveform having the pulse duration and a design peak magnitude substantially equal to the pulse magnitude, a first peak interval, a second peak interval, and a nadir interval therebetween. A magnitude of the nadir interval being a non-zero magnitude less than the nominal peak magnitude. The nadir interval being associated with the tissue attribute. As depicted 83, the method 80 includes delivering the dose of energy to the target tissue, the dose of energy including a plurality of pulses, each pulse from the plurality of pulses having the pulse waveform.

While various embodiments have been described above, it should be understood that they have been presented by way of example only, and not limitation. Where methods and/or schematics described above indicate certain events and/or flow patterns occurring in certain order, the ordering of certain events and/or operations may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above. Aspects have been described in the general context of medical devices, and more specifically surgical instruments, but inventive aspects are not necessarily limited to use in medical devices.

What is claimed is:

1. A method for treating a target tissue, the method comprising:
    disposing an electrode catheter in proximity to the target tissue; and
    delivering to the target tissue, via the electrode catheter, a dose of energy including a plurality of pulses, each pulse from the plurality of pulses having a maximal pulse magnitude and a pulse duration associated with a reference pulse that produces a desired permeability effect on the target tissue when the electrode catheter is spaced a reference distance apart from the target tissue, wherein:
        a pulse waveform of at least one pulse from the plurality of pulses includes, within the pulse duration, at least a first peak interval and a second peak interval with a nadir interval therebetween,
        a magnitude of the nadir interval is less than the maximal pulse magnitude and is a non-zero magnitude,
        a duration of the nadir interval is associated with a restitution interval associated with the target tissue, and
        the pulse waveform produces a permeability effect within the target tissue that is at least 80 percent of the desired permeability effect produced by the reference pulse when the electrode catheter is spaced the reference distance apart from the target tissue.

2. The method of claim 1, wherein:
    the delivery of the dose of energy causes at least one cell of the target tissue to transition to a nonviable state without affecting a structural integrity of the target tissue.

3. The method of claim 1, wherein:
    the magnitude of the nadir interval is in a range of 5% to 75% of a magnitude of the first peak interval.

4. The method of claim 1, wherein:
    the first peak interval has a first peak magnitude that is substantially equal to the maximal pulse magnitude of the pulse waveform; and
    the maximal pulse magnitude corresponds to a reference-pulse magnitude of the reference pulse.

5. The method of claim 1, wherein:
    the duration of the nadir interval is in a range of between 0.5 and 30 times the duration of the first peak interval.

6. The method of claim 1, wherein:
    each pulse of the plurality of pulses has an energy output that is in a range of between 10% and 75% of an energy output of the reference pulse.

7. The method of claim 1, wherein:
    the nadir interval is one of a plurality of nadir intervals of the pulse waveform;
    the first peak interval and the second peak interval are two peak intervals of a plurality of peak intervals of the pulse waveform;
    each peak interval of the plurality of peak intervals is separated from every other peak interval of the plurality of peak intervals by one of the nadir intervals of the plurality of nadir intervals; and
    each peak interval of the plurality of peak intervals has a peak magnitude that is less than the peak magnitude of an immediately preceding peak interval of the plurality of peak intervals.

8. The method of claim 7, wherein:
    a frequency of the plurality of peak intervals is within a range that develops an oxidative stress within the target tissue.

9. The method of claim 8, wherein:
    the frequency is an excitation frequency of a frequency domain output of a fast Fourier transform of the pulse waveform; and
    the excitation frequency of the plurality of peak intervals is within the range of 1.30 megahertz to 1.36 megahertz.

10. The method of claim 1, wherein:
    the pulse duration of each pulse of the plurality of pulses is in a range of 1 µs to 100 µs.

11. The method of claim 1, wherein:
    the permeability effect corresponds to transition of a pore in a cell wall of at least one cell of the target tissue to an open condition and maintaining the pore in the open condition for at least the pulse duration; and
    the pulse duration is greater than the restitution interval of the pore.

12. A method for affecting a target tissue with a pulsed electric field, the method comprising:
    determining, based on a plurality of attributes of the target tissue, a reference-pulse magnitude and a pulse duration of a reference pulse required to achieve a desired effect on the target tissue;
    determining a restitution interval for a cell membrane of the target tissue based on the plurality of attributes and the reference-pulse magnitude; and
    determining a pulse waveform of each pulse of a plurality of pulses of a dose of energy, the pulse waveform having the pulse duration and including at least a first peak interval and a second peak interval with a nadir interval therebetween, the pulse waveform having an additive permeability effect that substantially equals a permeability effect of the reference pulse, wherein determining the pulse waveform includes:
        determining a first-peak magnitude and a first-peak duration of the first peak interval of the pulse waveform based on the permeability effect and the plurality of attributes,
        determining a duration of the nadir interval based on the restitution interval, a magnitude of the nadir interval being less than first-peak magnitude; and
        delivering the dose of energy to the target tissue to affect the target tissue.

13. The method of claim 12, wherein:
    the permeability effect corresponds to a transition of a pore in a cell wall of at least one cell of the target tissue to an open condition and maintaining the pore in the open condition for at least the pulse duration; and
    the pulse duration is greater than the restitution interval of the pore.

14. The method of claim 13, wherein:
    the first-peak magnitude corresponds to the reference-pulse magnitude; and
    the first-peak magnitude develops an electrophoretic force that is sufficient to transition the pore in the cell wall to the open condition.

15. The method of claim 12, wherein:
    the duration of the nadir interval is less than the restitution interval.

16. The method of claim 12, wherein:
the duration of the nadir interval is greater than one half a duration of the first peak interval.

17. The method of claim 12, wherein:
the first peak interval has a first peak magnitude that is greater than an average magnitude of the nadir interval.

18. The method of claim 12, wherein:
each pulse of the plurality of pulses has an energy output that is less than an energy output of the reference pulse.

19. A method for treating a target tissue, the method comprising:
disposing an electrode catheter in proximity to the target tissue; and
delivering to the target tissue, via the electrode catheter, a dose of energy including a plurality of pulses at a first frequency, each pulse from the plurality of pulses having a maximal pulse magnitude and a pulse duration associated with a reference pulse that produces a desired effect on the target tissue, wherein:
a pulse waveform of at least one pulse from the plurality of pulses includes, within the pulse duration, a plurality of peak intervals and a plurality of nadir intervals, a nadir interval of the plurality of nadir intervals being between each pair of peak intervals of the plurality of peak intervals,
a magnitude of each nadir interval is less than the maximal pulse magnitude,
the plurality of peak intervals is at a second frequency,
the second frequency is within a range that develops an oxidative stress within the target tissue,
the second frequency is an excitation frequency of a frequency domain output of a fast Fourier transform of the pulse waveform; and
the excitation frequency of the plurality of peak intervals is within the range of 1.30 megahertz to 1.36 megahertz.

20. The method of claim 19, wherein:
the electrode catheter is disposed in a liquid; and
the first frequency of the plurality of pulses of the dose of energy corresponds to an oscillation frequency of a bubble formed in the liquid in response to the at least one pulse from the plurality of pulses.

21. The method of claim 19, wherein:
the excitation frequency is a high frequency component of the frequency domain output.

22. The method of claim 19, wherein:
the oxidative stress corresponds to an oxidation-reduction reaction within a lipid bilayer of a cell of the target tissue; and
the oxidation-reduction reaction within the lipid bilayer of the cell increases a permeability of the cell.

23. A method for treating a target tissue, the method comprising:
disposing an electrode catheter in proximity to the target tissue; and
delivering to the target tissue, via the electrode catheter, a dose of energy including a plurality of pulses, each pulse from the plurality of pulses having a maximal pulse magnitude and a pulse duration associated with a reference pulse that produces a desired permeability effect on the target tissue when the electrode catheter is spaced a reference distance apart from the target tissue, wherein:
a pulse waveform of at least one pulse from the plurality of pulses includes, within the pulse duration, at least a first peak interval and a second peak interval with a nadir interval therebetween,
a magnitude of the nadir interval is less than the maximal pulse magnitude,
a duration of the nadir interval is associated with a restitution interval associated with the target tissue and is in a range of between 0.5 and 30 times the duration of the first peak interval, and
the pulse waveform produces a permeability effect within the target tissue that is at least 80 percent of the desired permeability effect produced by the reference pulse when the electrode catheter is spaced the reference distance apart from the target tissue.

24. The method of claim 23, wherein:
the nadir interval is one of a plurality of nadir intervals of the pulse waveform;
the first peak interval and the second peak interval are two peak intervals of a plurality of peak intervals of the pulse waveform;
each peak interval of the plurality of peak intervals is separated from every other peak interval of the plurality of peak intervals by one of the nadir intervals of the plurality of nadir intervals; and
each peak interval of the plurality of peak intervals has a peak magnitude that is less than the peak magnitude of an immediately preceding peak interval of the plurality of peak intervals.

25. The method of claim 24, wherein:
a frequency of the plurality of peak intervals is within a range that develops an oxidative stress within the target tissue.

26. The method of claim 25, wherein:
the frequency is an excitation frequency of a frequency domain output of a fast Fourier transform of the pulse waveform; and
the excitation frequency of the plurality of peak intervals is within the range of 1.30 megahertz to 1.36 megahertz.

27. The method of claim 23, wherein:
the pulse duration of each pulse of the plurality of pulses is in a range of 1 μs to 100 μs.

28. The method of claim 23, wherein:
the permeability effect corresponds to transition of a pore in a cell wall of at least one cell of the target tissue to an open condition and maintaining the pore in the open condition for at least the pulse duration; and
the pulse duration is greater than the restitution interval of the pore.

29. The method of claim 23, wherein:
each pulse of the plurality of pulses has an energy output that is in a range of between 10% and 75% of an energy output of the reference pulse.

30. The method of claim 23, wherein:
the delivery of the dose of energy causes at least one cell of the target tissue to transition to a nonviable state without affecting a structural integrity of the target tissue.

* * * * *